(12) United States Patent
Priester et al.

(10) Patent No.: US 9,149,705 B2
(45) Date of Patent: Oct. 6, 2015

(54) MULTI-ROTOR APPARATUS AND METHOD FOR MOTION SCULPTING

(75) Inventors: William B. Priester, Jackson, TN (US); Richard E. May, Helena, AL (US); C. Bryan Dawson, Jackson, TN (US); David A. Ward, Jackson, TN (US); Georg Pingen, Jackson, TN (US)

(73) Assignee: William B. Priester, Jackson, TN (US)

( * ) Notice: Subject to any disclaimer, the term of this patent is extended or adjusted under 35 U.S.C. 154(b) by 507 days.

(21) Appl. No.: 13/602,842

(22) Filed: Sep. 4, 2012

(65) Prior Publication Data

US 2013/0005496 A1    Jan. 3, 2013

Related U.S. Application Data

(63) Continuation-in-part of application No. 12/237,502, filed on Sep. 25, 2008, now Pat. No. 8,398,501, which is a continuation-in-part of application No. 11/857,049, filed on Sep. 18, 2007, now Pat. No. 7,766,760, which is a continuation-in-part of application No. 10/681,971, filed on Oct. 9, 2003, now Pat. No. 7,351,157, application No. 13/602,842, which is a continuation-in-part of application No. 11/376,974, filed on Mar. 16, 2006, now Pat. No. 8,597,133.

(60) Provisional application No. 61/624,732, filed on Apr. 16, 2012.

(51) Int. Cl.
*A63B 69/36* (2006.01)
*A63B 24/00* (2006.01)
*G09B 19/00* (2006.01)
*A63B 71/06* (2006.01)

(52) U.S. Cl.
CPC ......... *A63B 69/3623* (2013.01); *A63B 24/0003* (2013.01); *A63B 69/3632* (2013.01); *A63B 71/06* (2013.01); *G09B 19/0038* (2013.01); *A63B 69/3614* (2013.01); *A63B 2071/0602* (2013.01); *A63B 2071/0627* (2013.01); *A63B 2207/02* (2013.01); *A63B 2220/40* (2013.01); *A63B 2220/806* (2013.01); *A63B 2225/01* (2013.01); *A63B 2225/09* (2013.01)

(58) Field of Classification Search
USPC ......... 473/219, 221, 222, 223, 226, 257, 437, 473/457
See application file for complete search history.

(56) References Cited

U.S. PATENT DOCUMENTS

| | | |
|---|---|---|
| 1,712,537 A | 5/1929 | White |
| 2,482,015 A | 9/1949 | McConnell |
| 2,804,306 A | 8/1957 | Chedister et al. |

(Continued)

*Primary Examiner* — Nini Legesse
(74) *Attorney, Agent, or Firm* — Luedeka Neely Group, P.C.

(57) ABSTRACT

A reversibly attachable muscle trainer includes a multi-arm structure with motion sensors and force generators for exercising opposing muscles of a person moving an implement so as to maintain an ideal movement. When attached to the implement, the muscle trainer trains the opposing muscles to consistently move the implement in an ideal way. While the person moves the implement with the muscle trainer attached, a processor receives signals from the motion sensors and determines differences between the actual implement motion and an ideal implement motion. The difference indicates a dominating force direction in which the dominating muscles urge the implement. The processor activates the force generators to apply external forces to the implement to urge the implement in various types of training force directions.

17 Claims, 26 Drawing Sheets

(56) References Cited

U.S. PATENT DOCUMENTS

| | | |
|---|---|---|
| 2,910,297 A | 10/1959 | Bonetate |
| 3,565,444 A | 2/1971 | LaRocca |
| 3,758,117 A | 9/1973 | Harrison |
| 3,809,397 A | 5/1974 | Gruenewald |
| 3,829,102 A | 8/1974 | Harrison |
| 3,997,115 A | 12/1976 | Licudine |
| 4,017,083 A | 4/1977 | Johnson |
| 4,379,552 A | 4/1983 | Webb et al. |
| 4,576,378 A | 3/1986 | Backus |
| 4,907,800 A | 3/1990 | Passamaneck |
| 5,096,199 A | 3/1992 | Wyatt, Jr. et al. |
| 5,100,148 A | 3/1992 | Smith |
| 5,143,376 A | 9/1992 | Johnson |
| 5,165,683 A | 11/1992 | Beutler et al. |
| 5,184,825 A | 2/1993 | Ruth |
| 5,209,482 A | 5/1993 | Hopfer |
| 5,230,512 A | 7/1993 | Tattershall |
| 5,236,192 A | 8/1993 | Pitzel |
| 5,338,035 A | 8/1994 | Lyford |
| 5,362,059 A | 11/1994 | Grossman |
| 5,435,696 A | 7/1995 | Cunning |
| 5,441,269 A | 8/1995 | Henwood |
| 5,456,650 A | 10/1995 | Williams, Jr. et al. |
| 5,571,048 A | 11/1996 | Kenney |
| 5,613,915 A | 3/1997 | Van Allen, Jr. |
| 5,634,857 A | 6/1997 | Bradshaw et al. |
| 5,845,885 A | 12/1998 | Carnevali |
| 5,971,828 A | 10/1999 | Lin |
| 5,971,864 A | 10/1999 | Joshi et al. |
| D416,081 S | 11/1999 | Lee |
| 6,079,949 A | 6/2000 | Litvin |
| 6,224,493 B1 | 5/2001 | Lee et al. |
| 6,238,299 B1 | 5/2001 | Barnette |
| 6,441,745 B1 | 8/2002 | Gates |
| 6,533,551 B2 | 3/2003 | Escobar |
| 6,739,981 B1 | 5/2004 | Lin |
| 6,851,933 B2 | 2/2005 | Cortez |
| 7,351,157 B2 * | 4/2008 | Priester et al. ............... 473/228 |
| 7,384,344 B2 * | 6/2008 | Aguirre ....................... 473/226 |
| 7,494,420 B1 * | 2/2009 | Whalen ........................ 473/228 |
| 8,398,501 B2 * | 3/2013 | Priester et al. ............... 473/219 |
| 8,597,133 B2 * | 12/2013 | Priester ....................... 473/257 |
| 2001/0031666 A1 | 10/2001 | Knecht |
| 2002/0016213 A1 | 2/2002 | Templeton |
| 2004/0097297 A1 | 5/2004 | Strite |

* cited by examiner

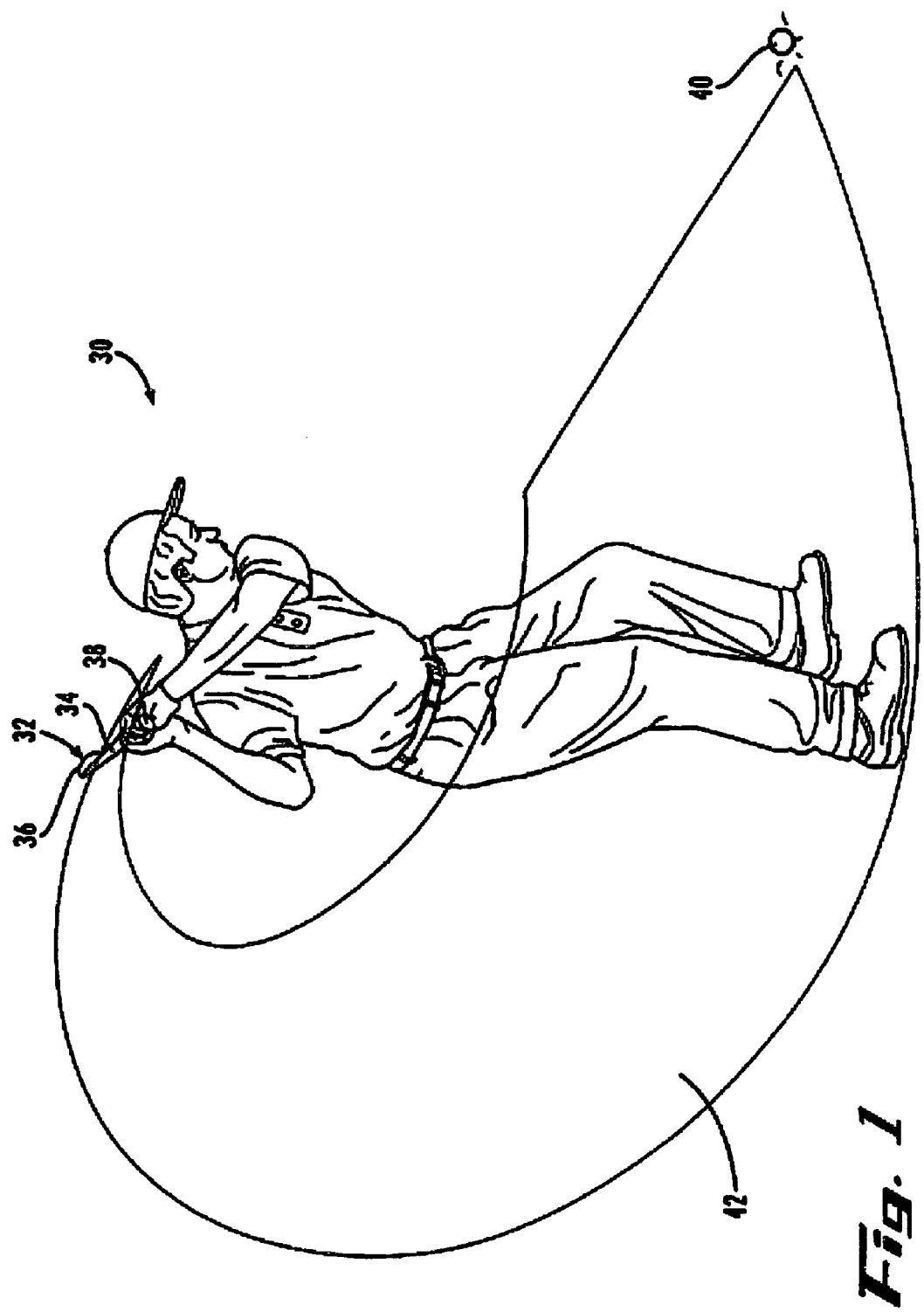

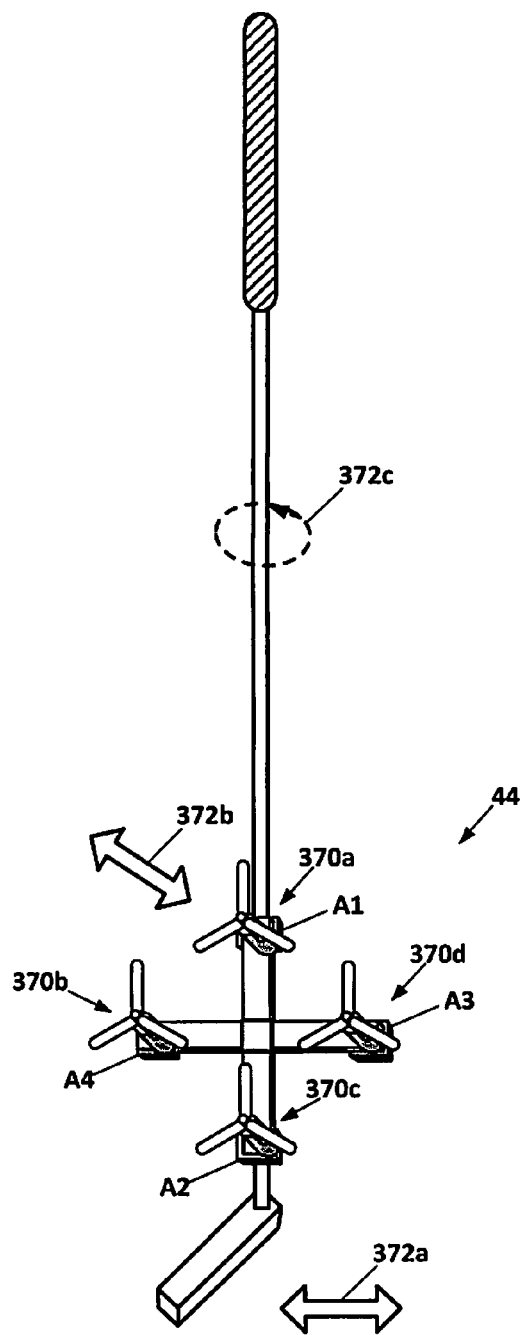
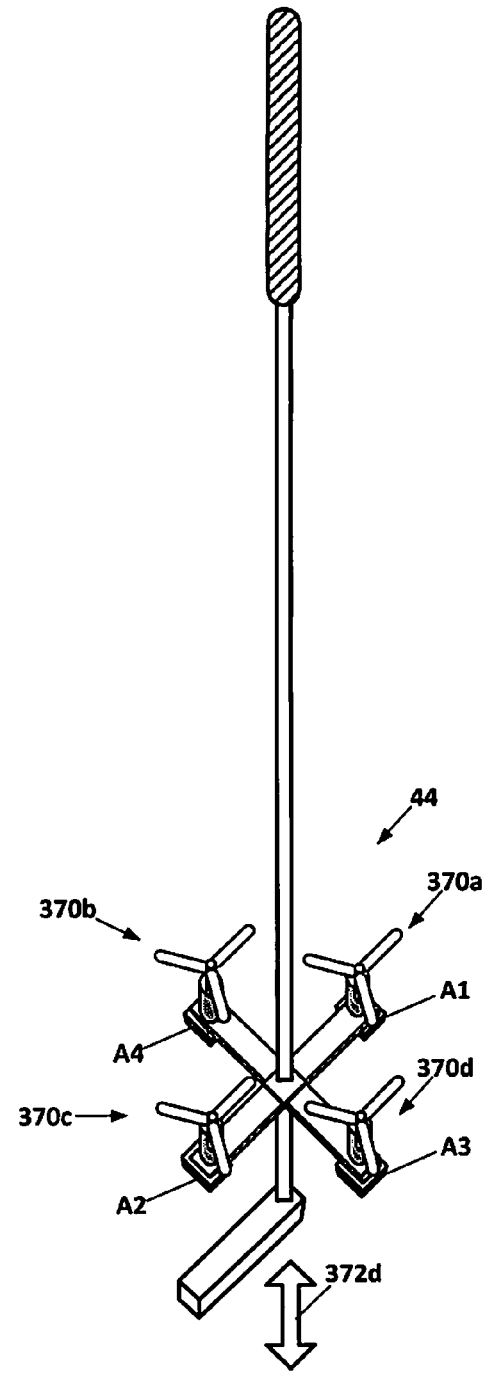
FIG. 4A  FIG. 4B

|  | Over-rotation (O) | Merged (M) | Under-rotation (U) |
|---|---|---|---|
| Behind-the-ideal-shaft-plane (B) | B/O | B/M | B/U |
| In-the-ideal-shaft-plane (I) | I/O | I/M | I/U |
| Front-of-the-ideal-shaft-plane (F) | F/O | F/M | F/U |

*FIG. 14*

|  | Hook (H) | Square (+) | Slice (S) |
|---|---|---|---|
| Error Inside Out (EIO) | EIO/H | EIO/+ | EIO/S |
| Ideal Inside Out (IIO) | IIO/H | IIO/+ | IIO/S |
| Error Outside In (EOI) | EOI/H | EOI/+ | EOI/S |

*FIG. 15*

MULTI-ROTOR APPARATUS AND METHOD FOR MOTION SCULPTING

RELATED APPLICATIONS

This application claims priority as a continuation-in-part to U.S. patent application Ser. No. 12/237,502 filed Sep. 25, 2008, titled "Muscle Training Apparatus and Method," which issued as U.S. Pat. No. 8,398,501, which is a continuation-in-part of U.S. patent application Ser. No. 11/857,049 filed Sep. 18, 2007, which issued as U.S. Pat. No. 7,766,760, which is a continuation-in-part of U.S. patent application Ser. No. 10/681,971 filed Oct. 9, 2003, which issued as U.S. Pat. No. 7,351,157. This application also claims priority as a continuation-in-part of U.S. patent application Ser. No. 11/376,974 filed Mar. 16, 2006, titled "Motion Training Apparatus and Method", which issued as U.S. Pat. No. 8,597,133, and U.S. provisional patent application Ser. No. 61/624,732 filed Apr. 16, 2012, titled "Multi-rotor Apparatus and Method for Motion Sculpting." The entire contents of these prior applications are incorporated herein by reference.

FIELD

This invention relates to a muscle trainer and to methods of exercising a muscle. This invention particularly relates to a muscle trainer for use by an individual when exercising one or more muscles used to move an implement and to methods of exercising such muscles.

BACKGROUND OF THE INVENTION

Many types of activities require an individual to move an implement in an attempt to successfully accomplish the end goal of participation in such activity. For example, when participating in any of several sporting games, an individual may be required to move any of several different implements, each of which is unique to a particular one of the games. Examples of such implements include a bat in the games of baseball and softball, a racket used in the games of tennis and racket ball, a club used in the game of golf, a weapon used in hunting or warfare, and a handheld video gaming or automated reality implement. The movement of an implement is also required in certain non-sports or work environments such as, for example, the swinging of a maul, a hammer or an axe.

In any of the above-noted activities, an efficient and desired end result may be achieved from the movement of the implement when the implement is moved in an ideal path. The ideal path will vary depending on the individual's height, build and flexibility. When an individual moves the implement in that individual's ideal path, various muscle groups must function together in a precise way. The need for muscular precision is particularly apparent in the game of golf, where the implement is a golf club and the individual is a golfer. If the individual is aligned properly and is swinging the implement at the proper speed along the ideal path, the end result will also be ideal.

In the game of golf, the golf club includes a metal or non-metal-composite shaft having a club head attached to one end of the shaft and a gripping material, referred to as "the grip," attached to the other end of the shaft. Another component of the game of golf is a golf ball. The general object of the game is for the golfer, by use of the club, to cause the ball to be moved typically from an earthen mound, referred to as "the tee," toward and into a small container, referred to as "the cup", which is located in a carpet of short grass, referred to as "the green," typically several hundred yards from the tee.

The golfer causes the ball to be moved generally by (1) grasping the grip of the club with both hands, (2) "addressing" the ball with the club head which includes aligning "a sweet spot" of a front, or ball-impact, face of the club head with the ball, (3) raising the club, desirably through the ideal path, in a motion referred to as "the backswing," (4) locating the shaft of the club, upon completion of the backswing, in a transitional position behind the head of the golfer, (5) swinging the club forward from the transitional position, desirably returning through the ideal path, in a momentum-gathering motion referred to as "the downswing" and, desirably, (6) directing the sweet spot of the front face of the club head into impact-engagement with the ball to drive the ball along a desired trajectory and direction, leading to eventual placement of the ball in the cup.

The combined motions of the backswing and the downswing are referred to as "a stroke." Typically, several strokes by the golfer are required to advance the ball along a path, commonly referred to as "the fairway," between the tee and the green, and to its ultimate destination in the cup.

When the golfer addresses the ball with the ball-impacting front face of the club head (hereinafter referred to as the club face), the sweet spot of the club face is adjacent and aligned with the ball as noted above. As the golfer begins the backswing, the club head is moved through an arc away from the ball, but desirably maintains an initial arcing alignment between the club face and the ball. At some point during the initial segment of the backswing, there is anatomical/mechanical necessity for some degree of rotation of the club shaft such that the club face loses its arcing alignment with the ball. As the golfer swings the club through the downswing of the stroke, the golfer must effectively rotate the club in the reverse direction, preferably just before impact with the ball, to return the club face to arcing alignment with the ball.

Desirably, following movement of the club through the full stroke, the golfer should have returned the club face through the ideal path to the addressed position with the momentum necessary to effectively strike and carry the ball in a desired trajectory and direction.

While it is a practical impossibility to accomplish a "perfect" golf swing each and every time a golfer swings the club to impact the ball, several professional golfers seem to accomplish a near "perfect" swing on a reasonably consistent basis. In attempts to bring some semblance of a near "perfect" swing to at least non-professional golfers, techniques have been developed to train the swinging muscles of a golfer with a goal of developing muscle memory to provide a more consistent and efficient golf swing. Even so, there remains a need for a device and methods that will better enable the golfer, or any one moving an implement, to move the club or other implement along an ideal path.

SUMMARY OF THE INVENTION

The above and other needs are met by a muscle trainer and methods which contemplate that when an individual moves an implement along a path, a first muscle or set of muscles exerts a pulling force on the moving implement in a first direction generally laterally of the ideal path. At the same time, a second muscle or set of muscles exerts a pulling force on the moving implement in a second direction generally laterally of the ideal path and generally in a direction that is opposite to the first direction. If the first and second muscles or sets of muscles are of equal strength, the opposing pulling forces exerted upon the implement tend to maintain the implement in an ideal path to achieve the ideal end result in an efficient and desirable manner.

As used hereinafter, the word "muscle" can mean a single muscle, a set of muscles, or both.

When moving the implement, if the first muscle is stronger than the second muscle, the first muscle will dominate the weaker second muscle to the extent that the implement is pulled laterally away from the ideal path in the first direction, whereby the individual is not moving the implement in the most efficient manner to accomplish the task at hand. This undesirable dominant muscle condition and its attendant disadvantages are particularly apparent in sporting games such as, for example, the game of golf, where the implement is a golf club and the individual is a golfer.

One of the primary goals in golf involves achieving an ideal plane of the swing of the golf club. The ideal backswing plane has been described as being like a sheet of glass resting on the golfer's shoulders and extending to the golf ball. Producing the ideal downswing plane requires that the sheet of glass is shifted to a flatter angle and is skewed for a more inside to outside club shaft path. To achieve these ideal planes, the path that the club shaft must follow during the swing must be an ideal one. However, the ideal club shaft path does not typically coincide with a true plane like a sheet of glass. The non-planar nature of the ideal club shaft path is more apparent in the backswing, in which the ideal club shaft path has been described as having a significant upward curvature.

In an attempt to marry these conflicting visual images of curves and planes, the term "club shaft plane" will hereinafter be used in preference to the terms club shaft path and swing plane. As mentioned above, it would be very difficult, if not impossible, for a human being to swing a golf club through a complete stroke while keeping the club shaft in one club shaft plane which is a true plane. Hence, it is correct to state that the path in which the club shaft travels is not typically a true plane. In fact, there are an infinite number of singular positions of the club shaft along the golf club's path of travel throughout the entire swing. At each of these positions, there is a singular club shaft plane that rests in the spatial field representing the direction of travel of the club shaft for that position only. In other words, at each position of the club in a swing, there is a single plane that coincides with the club shaft's instantaneous direction vector. For simplicity, the composite of these infinite number of singular club shaft planes is referred to herein as the club shaft plane. It may also be referred to as the composite club shaft plane. For each golfer, there are ideal club shaft planes for the backswing, downswing, and follow-through that may vary slightly depending on the type of shot being played. These ideal club shaft planes will be different for each golfer depending on the golfer's height, build, and flexibility.

To best visualize the club shaft plane, observation of the golfer's swing should take place from a position looking down the target line on the takeaway side of the golfer's swing. From this perspective, a common error is for the golfer to allow the club shaft to deviate behind or in front of their ideal club shaft plane. To achieve the result of keeping the club shaft within the ideal club shaft plane, a group of opposing muscles in the golfer's torso, shoulders, arms, and hands must function in a proper manner. This muscle group is referred to as the "club shaft plane opposing muscle group." The two sets of opposing muscles within the club shaft plane opposing muscle group are the "behind-the-plane muscles" and the "front-of-the-plane muscles." One could consider these two sets of opposing muscles as being in a tug-of-war, pulling against each other to determine the actual club shaft plane. Ideally then, these two sets of muscles should be of appropriate strength, such that neither set dominates the other set, and the shaft of the club is maintained within, and is not moved laterally from, the ideal club shaft plane.

To better represent the movement of the entire golf club in space, the position of the club face will hereinafter be referred to as the club face plane. Regardless of the loft of the club face, the club face plane represents the position of the club face as if the club face had zero degrees of loft. Unlike the club shaft plane that typically has some degree of curvature, the club face plane is a true plane since it is an extension of the zero degree club face. The concepts of the club face plane and the club shaft plane help one to visualize the relationship between the movement of the club face and the club shaft during the golf swing. An approximation of the proper relationship between these two planes is described in a "two-plane-merger" golf swing theory.

The tug-of-war between the behind-the-plane muscles and the front-of-the-plane muscles is accompanied by the anatomical/mechanical need for rotation of the shaft and club face plane during the swing. Two-plane-merger can be explained by the following discussion of swing positions.

At the address, or six o'clock, position, the club face plane is ideally a vertical plane which is essentially perpendicular to the club shaft plane. In a face-to-face perspective while observing the swing of a right handed golfer, the club face plane is rotated in a counter-clockwise direction about the axis of the club shaft to achieve a mechanically efficient movement in which the club face plane "slices" through the air in an aerodynamic fashion. Somewhere between the eight o'clock and ten o'clock backswing positions, the club face plane has been rotated approximately ninety degrees in a counter-clockwise direction so that the club face plane "merges" and is substantially "co-planar" with the club shaft plane. This approximate ninety degree rotation creates what is referred to as the "merged position." At the backswing completion position and during the downswing, the club face plane remains approximately merged with the club shaft plane until just before impact when the club face plane is rotated ninety degrees in a clockwise direction to achieve a "square" impact position which is perpendicular to the club shaft plane. The relationship of the club face plane and the club shaft plane during the follow-through is a mirror image of the relationship of the two planes during the backswing with an approximate remerger of the two planes occurring somewhere between the four o'clock and two o'clock follow-through positions.

It follows that the two-plane-merger zone of the golf swing exists above the substantially horizontal line connecting the nine o'clock backswing position and the three o'clock follow-through position. Of course, ideal rotation for an individual golfer may not include any instance of true two-plane-merger. The zone of the golf swing below this horizontal line is referred to as the two plane perpendicular zone or impact zone.

The rotation of the club shaft and the club face plane to bring about approximate two-plane-merger utilizes a group of opposing muscles in the arms and hands referred to as the "rotational opposing muscle group." With an observer in a face-to-face perspective with a right handed or left handed golfer, the two sets of opposing muscles in the rotational opposing muscle group are referred to as the "counter-clockwise rotational muscles" and the "clockwise rotational muscles." The counter-clockwise rotational muscles move the club face plane in counter-clockwise direction, such that if the face-to-face observer were looking at the clubface plane as the hand on a clock, it would be moving from 12:00 towards 9:00. It follows that, in the same perspective, the clockwise muscles move the club face plane from 12:00 towards 3:00.

Over-action of either set of opposing rotational muscles will result in rotational errors. During the backswing of a right-handed golfer, over action of the counter-clockwise rotational muscles will result in an angle of rotation of the club face plane greater than ideal rotation and an "open" club face position. Over action of the clockwise rotational muscles will result in an angle of rotation of the club face plane less than ideal rotation and a "shut" or "closed" club face position.

During the backswing of a left-handed golfer, over action of the clockwise rotational muscles will result in an angle of rotation of the club face plane of greater than ideal rotation and an open club face position. Over action of the counter clockwise rotational muscles will result in an angle of rotation of the club face plane less than ideal rotation and a shut or closed club face position.

A third group of opposing muscles in the arms and hands controls the hinging movement of the club during the swing. This group of opposing muscles is referred to as the "hinge opposing muscle group" and is composed of two sets of opposing muscles, the "hinge loading muscles" and the "hinge releasing muscles."

In a face-to-face perspective with a right-handed or left-handed golfer, the hinge opposing muscle group can be isolated by elevating and lowering the head of the club within the vertical club face plane at the six o'clock address position. While keeping the arms and the rest of the body in relatively fixed position, maximal elevation of the club head without rotation of the club face plane demonstrates maximum and isolated function of the hinge loading muscles. Returning the maximally elevated club head to the six o'clock address position without rotation of the club face plane similarly demonstrates maximum and isolated function of the hinge releasing muscles.

For a right-handed golfer, the hinge angle ϕ is the angle between the club shaft and the left forearm. For a left-handed golfer, the hinge angle ϕ is the angle between the club shaft and the right forearm. Professional golfers will intentionally vary the change in their hinge angle depending on the type of shot they are playing. Given that professional golfers will frequently flatten their downswing club shaft plane in relation to their backswing club shaft plane, it is incorrect to assume that the address hinge angle will be identical to the impact hinge angle.

To illustrate hinge errors, the intentional change in the hinge angle during the backswing will be arbitrarily set at ninety degrees. An under loaded hinge error occurs during the backswing when the change in the hinge angle is less than ninety degrees. An over loaded hinge error occurs during the backswing when the change in the hinge angle is greater than ninety degrees.

An early release of the hinge angle error during the downswing occurs when the golfer allows the hinge angle to begin increasing before the club shaft approaches a horizontal position relative to the ground. This is one of the most common errors in golf and is referred to as "casting." This power wasting error is called casting because the motion resembles what a fisherman intentionally does with his wrists when casting the end of his fishing line towards a landing spot target. Casting is definitely the most common and swing-disrupting hinging error. A late release of the hinge angle error during the downswing occurs when the golfer does not allow the hinge angle to begin increasing at the appropriate hinge release point. This is a very uncommon error.

An under released hinge angle error occurs during the downswing when the golfer does not allow the hinge angle to increase to the ideal impact hinge angle. This error plays a role in hitting "thin" shots and "topped" shots. A thin shot occurs when ball is struck at a place below the "sweet spot." The sweet spot is the ideal point of impact on the club face. A topped shot occurs when the lower edge of the club face strikes the ball above its equator, resulting in a downward trajectory of the ball into the ground. An over released hinge angle error occurs during the downswing when the golfer allows the hinge angle to increase beyond the ideal impact hinge angle. This error plays a role in hitting "fat" shots. A fat shot occurs when the lower edge of the club face strikes the ground before the club face contacts the ball.

A fourth group of opposing muscles controls the arc of the swing. The arc of the swing refers to the path of the club head and is determined by the amount of extension of the hands away from the golfer's body, the timing of the wrist hinge, the amount of flexion of the left elbow of a right-handed golfer, the amount of flexion of the right elbow of a left-handed golfer, the amount of shoulder turn, the amount of hip turn, and the amount of lateral movement of the golfer's torso (also referred to as "sway"). This group of opposing muscles is referred to as the "arc opposing muscle group" and is comprised of the "arc enhancing muscles" and the "arc contracting muscles."

Some professional golfers, such as Tiger Woods, intentionally try to create as much arc as possible in their swings. Others, such as Nick Faldo, opt for a shorter arc with an earlier wrist hinge.

It follows that arc errors occur simply when the actual arc of a golfer's individualized swing is not located at the ideal arc. Over-arc errors occur when the actual arc is greater than the ideal arc. Under-arc errors occur when the actual arc is less than the ideal arc.

Along with hinging errors, arc errors play a role in hitting topped and fat shots as well as shanked shots (ball contacts the hosel where the club shaft attaches to the club head) and toed shots (ball contacts the club face outside of the sweet spot toward the distal end of the club face).

It should also be appreciated that in a complex motion like the golf swing there are other opposing muscle groups, in addition to the four opposing muscle groups mentioned above, which can also be delineated and trained.

Speed is a swing variable that is influenced by the combined actions of all the opposing muscle groups in the swing. The speed of the backswing is typically slower than the speed of the downswing. Variation in the speed of the swing and the timing of the transition between the backswing and downswing create the tempo of the swing. Speed and tempo are much easier to manipulate and manage once the golfer has acquired the proper muscle memory for their ideal club shaft plane, ideal two-plane merger, ideal hinging, ideal arc and ideal performance of other opposing muscle groups.

The exercising and improvement of memory patterns of opposing muscle groups, such as, for example, the four opposing muscle groups described above, can be accomplished by working the various sets of opposing muscles through motions which are akin to the motions typically utilized when swinging a golf club in the normal fashion. If the dominant, or stronger, set of opposing muscles is exercised to the same extent as the dominated, or weaker, set of opposing muscles, any strength imbalance between the two sets of opposing muscles will be undesirably maintained. If the dominated set of opposing muscles is exercised solely in an effort to bring the strength level thereof in line with the dominating set of opposing muscles, then the dominating muscles would tend to lose muscle tone, and the desired memory patterns of the two sets of opposing muscles would be difficult, if not impossible, to attain.

Thus, there is a need for a muscle training apparatus and methods of exercising which will provide simultaneous sustained exercising of sets of opposing muscles leading to the development of desired memory patterns, while, at the same time, processing the dominated set of opposing muscles through a more strenuous exercise program, to eventually provide balanced muscle strength of the sets of opposing muscles. These and other needs are met by various embodiments of an invention that provides methods of exercising muscles used in moving a handheld implement.

In one embodiment, a muscle training apparatus determines characteristics of a movement of a shaft of an implement by a person during performance of a useful or recreational function. The muscle training apparatus of this embodiment includes a support structure having multiple arms extending outwardly from a central portion of the support structure, including a first arm and a second arm disposed to an opposite side of the central portion from the first arm. Each has a proximal end and a distal end. An attachment mechanism reversibly attaches the central portion of the support structure to the shaft of the implement, so that the proximal ends of the arms are disposed adjacent the shaft.

The apparatus includes a first sensor disposed adjacent the distal end of the first arm and a second sensor disposed adjacent the distal end of the second arm. The first sensor generates a first sensor signal indicative of a plurality of first positions and first directions of travel of the distal end of the first arm during the movement. The second sensor generates a second sensor signal indicative of a plurality of second positions and second directions of travel of the distal end of the second arm during the movement. The first and second positions and the first and second directions of travel of the first sensor and the second sensor at any particular point in the movement define an individual average shaft velocity vector coinciding with the direction of travel of the shaft, and an individual shaft displacement vector aligned with the first position and the second position at the particular point.

The apparatus includes a processor for calculating a plurality of individual average shaft velocity vectors, individual shaft displacement vectors, individual normal vectors, and corresponding individual implement shaft planes based on the first and second sensor signals. At any particular point in the movement, an individual implement shaft plane coincides with a corresponding individual average shaft velocity vector and an individual shaft displacement vector at the particular point. This plane is perpendicular to an individual normal vector at the particular point.

In some embodiments, the processor determines whether the difference between the individual shaft planes and an ideal individual shaft plane exceeds a shaft plane tolerance at one or more positions during the movement. The processor generates a shaft plane error signal when the difference exceeds the shaft plane tolerance.

Some embodiments of the muscle training apparatus include force generators attached adjacent the distal ends of the arms that generate a training force based on the shaft plane error signal. In a preferred training method, the training force urges the shaft in a direction that would increase the difference if the training force is not opposed by muscle force exerted by the person. This training method is referred to as "error augmentation."

An alternative training method involves generating a training force that urges the shaft in a direction that would decrease the difference if the training force is not opposed by muscle force exerted by the person. This training method is referred to as "guiding."

A third training method involves generating training forces that urge the shaft in random directions. This training method is referred to as "noisy."

In some embodiments, the support structure includes a third arm and a fourth arm disposed to an opposite side of the central portion from the third arm. The arms are arranged such that a line parallel to the third and fourth arms is perpendicular to a line parallel to the first and second arms. A third sensor is disposed adjacent the distal end of the third arm and a fourth sensor is disposed adjacent the distal end of the fourth arm. The third sensor generates a third sensor signal indicative of a plurality of third positions and third directions of travel of the distal end of the third arm during the swing. The fourth sensor generates a fourth sensor signal indicative of a plurality of fourth positions and fourth directions of travel of the distal end of the fourth arm during the movement. The first position, second position, third position and fourth position at any particular point in the movement define an implement face plane at the particular point. The processor calculates the implement face plane based on the first, second, third, and fourth sensor signals.

In some embodiments, the processor also calculates a rotation angle between the implement face plane and the corresponding implement shaft plane at one or more positions during the movement. In some embodiments, the processor determines whether the difference between the rotation angle and an ideal rotation angle exceeds a rotation angle tolerance at one or more positions during the movement. The processor generates a rotation error signal when the difference exceeds the rotation angle tolerance.

Some embodiments of the muscle training apparatus include force generators attached adjacent the distal ends of the arms that generate a training force based on the rotation error signal. In the error augmentation training method, the training force urges the shaft to rotate in a direction that would increase the difference if the training force is not opposed by muscle force exerted by the person.

In the guiding training method, the training force urges the shaft to rotate in a direction that would decrease the difference if the training force is not opposed by muscle force exerted by the person.

In the noisy training method, the training force urges the shaft to rotate in random directions.

In some embodiments, the muscle training apparatus includes a fifth sensor attached adjacent the elbow and a sixth sensor attached adjacent the wrist of the person moving the implement. The fifth sensor generates a fifth sensor signal indicative of a plurality of fifth positions and fifth directions of travel of the elbow during the movement. The sixth sensor generates a sixth sensor signal indicative of a plurality of sixth positions and sixth directions of travel of the wrist during the movement. The fifth and sixth positions and the fifth and sixth directions of travel at any particular point in the movement define an individual average forearm velocity vector that coincides with the direction of travel of the forearm of the person, and an individual forearm displacement vector aligned with the fifth position and sixth position at the particular point.

The processor calculates a plurality of individual average forearm velocity vectors, a plurality of individual forearm displacement vectors, a plurality of individual normal vectors, and a plurality of corresponding individual forearm planes based on the fifth and sixth sensor signals. At any particular point in the movement, an individual forearm plane coincides with a corresponding individual average forearm velocity vector and an individual forearm displacement vector at the particular point. This plane is perpendicular to an individual normal vector at the particular point.

In some embodiments, the processor calculates a hinge angle between an individual forearm displacement vector and a corresponding individual shaft displacement vector at one or more positions during the movement. In some embodiments, the processor determines whether the difference between the hinge angle and an ideal hinge angle exceeds a hinge angle tolerance at one or more positions during the movement. The processor generates a hinge error signal when the difference exceeds the hinge angle tolerance.

Some embodiments of the muscle training apparatus include force generators attached adjacent the distal ends of the arms that generate a training force based on the hinge error signal. In the error augmentation training method, the training force urges the shaft in a hinge direction that would increase the difference if the training force is not opposed by muscle force exerted by the person.

In the guiding training method, the training force urges the shaft in a hinge direction that would decrease the difference if the training force is not opposed by muscle force exerted by the person.

In the noisy training method, the training force urges the shaft in random hinge directions.

In some embodiments, the muscle training apparatus includes a seventh sensor attached adjacent a xiphoid process at a lower portion of the sternum of the person moving the implement. The seventh sensor generates a seventh sensor signal indicative of a plurality of seventh positions and seventh directions of travel of the xiphoid process during the movement. The seventh positions and seventh directions of travel at any particular point in the movement define an individual average xiphoid process velocity vector coinciding with the direction of travel of the xiphoid process of the person, and an individual arc displacement vector aligned between the second position and seventh position at the particular point.

The processor of these embodiments calculates a plurality of individual average arc velocity vectors, a plurality of individual arc displacement vectors, a plurality of individual normal vectors, and a plurality of corresponding individual arc planes based on the second and seventh sensor signals. At any particular point in the movement, an individual arc plane coincides with a corresponding individual average arc velocity vector and an individual arc displacement vector at the particular point. This plane is perpendicular to an individual normal vector at the particular point.

In some embodiments, the processor calculates an arc distance between the seventh position and the second position during the movement. In some embodiments, the processor determines whether the difference between the arc distance and an ideal arc distance exceeds an arc distance tolerance at one or more positions during the movement. The processor generates an arc error signal when the difference exceeds the arc distance tolerance.

Some embodiments of the muscle training apparatus include force generators attached adjacent the distal ends of the arms for generating a training force based on the arc error signal. In the error augmentation training method, the training force urges the shaft in a direction that would increase the difference if the training force is not opposed by muscle force exerted by the person.

In the guiding training method, the training force urges the shaft in a direction that would decrease the difference if the training force is not opposed by muscle force exerted by the person.

In the noisy training method, the training force urges the shaft in random directions.

In various embodiments, the reversibly attachable muscle trainer with force generators may be attached to various handheld implements that are moved when in use, such as a golf club, a baseball bat, a softball bat, a tennis racket, a racket ball racket, an axe, a hammer, a maul, a weapon, a video gaming implement and an automated reality implement. This list could include any handheld implement used to perform a useful or recreational function. Even though error augmentation, guidance, and noise are the feedback methods detailed herein, various other feedback methods could be employed in using the reversibly attachable muscle trainer.

Another potential use for the reversibly attachable muscle trainer is to provide feedback forces for video gaming implements or automated reality implements. Activation of force generators on the muscle trainer at precise times during the video game or automated reality exercise would give the participant a more real world experience. One example is use of the force generators to provide simulated gun recoil.

Embodiments directed to this use provide neuromotor feedback to a person grasping an automated reality implement that is part of an automated reality system during performance of a useful or recreational automated reality function. A method for providing feedback include the following steps:
(a) attaching a feedback apparatus to the automated reality implement such that the weight of the feedback apparatus is supported entirely by the automated reality implement;
(b) the feedback apparatus sensing positions of the automated reality implement;
(c) the feedback apparatus receiving one or more signaling inputs provided by the person or the automated reality system;
(d) the feedback apparatus applying one or more external forces to the automated reality implement; and
(e) the person performing a movement of the automated reality implement while the one or more external forces are applied.

Another related embodiment provides neuromotor feedback to a person grasping a video game implement that is part of a video game system during performance of a video game. The method of this embodiment includes:
(a) attaching a feedback apparatus to the video game implement such that the weight of the feedback apparatus is supported entirely by the video game implement;
(b) the feedback apparatus sensing positions of the video game implement;
(c) the feedback apparatus receiving one or more signaling inputs provided by the person or the video game system;
(d) the feedback apparatus applying one or more external forces to the video game implement; and
(e) the person performing a movement of the video game implement while the one or more external forces are applied.

Another embodiment provides a method of exercising muscles typically used by a person when attempting to perform an ideal movement of an implement during performance of a useful or recreational function. This method includes:
(a) attaching a muscle trainer to the implement such that the weight of the muscle trainer is supported entirely by the implement;

(b) the muscle trainer determining the ideal movement of the implement for the person;
(c) the person performing a movement of the implement by application of forces exerted by the muscles of the person;
(d) the muscle trainer determining a difference between the movement of step (c) and the ideal movement determined in step (b) at a plurality of points during the movement of step (c);
(e) the muscle trainer applying one or more external forces to the implement;
(f) the person performing a movement of the implement by application of forces exerted by the muscles of the person while the one or more external forces are applied.

A further embodiment provides a method of limiting domination of a dominating muscle of two opposing muscles typically used by a person when attempting to perform an ideal movement of an implement during performance of a useful or recreational function. The dominating muscle applies a dominating force to the implement in a dominating force direction, and a non-dominating muscle of the two opposing muscles applies a non-dominating force to the implement in a non-dominating force direction. The non-dominating force direction is substantially opposite the dominating force direction, and the dominating force exceeds the non-dominating force. If the two opposing muscles were of appropriate strength, the two opposing muscles would desirably apply opposing forces to the implement at appropriate levels to perform the ideal movement. The method thereby trains the opposing muscles to consistently perform the ideal movement. The method includes:
(a) attaching a muscle trainer to the implement such that the weight of the muscle trainer is supported entirely by the implement;
(b) the muscle trainer determining the ideal movement of the implement for the person;
(c) the person performing a movement of the implement by application of forces exerted by the two opposing muscles of the person;
(d) the muscle trainer determining a difference between the movement of step (c) and the ideal movement determined in step (b) at a plurality of points during the movement of step (c), where the difference at each point indicates the dominating force direction at that point;
(e) the muscle trainer applying one or more external forces to the implement to urge the implement in a direction; and
(f) the person performing a movement of the implement by application of forces exerted by the two opposing muscles of the person while the one or more external forces are applied.

BRIEF DESCRIPTION OF THE DRAWINGS

Further advantages of the invention are apparent by reference to the detailed description considered in conjunction with the figures, which are not to scale so as to more clearly show the details, wherein like reference numbers indicate like elements throughout the several views, and wherein:

FIG. 3 is a perspective view showing a golfer with the club having nearly reached the backswing completion position and being located undesirably in front of the ideal club shaft plane of FIG. 1;

FIGS. 4A and 4B are perspective views of a reversibly attachable muscle trainer in accordance with preferred embodiments of the invention;

FIG. 14 depicts a probability square representing nine states of motion in the two-plane-merger zone of the golf swing;

FIG. 15 depicts a probability square representing nine states of motion in the impact zone of the golf swing;

DETAILED DESCRIPTION OF PREFERRED EMBODIMENTS OF THE INVENTION

Figure 1:
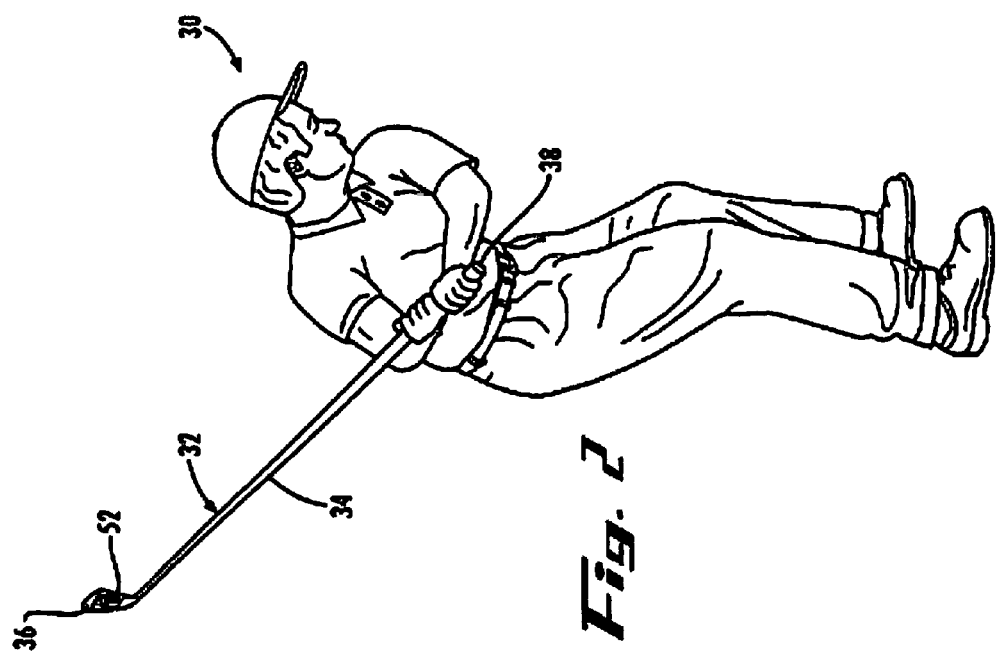
FIG. 1 is a perspective view showing a golfer having moved a golf club fully through a backswing to a backswing-completion position (hereinafter referred to as the three o'clock "toe down" position by viewing the club as being the hand of a clock) and through a generally "C" shaped path, the plane of which is referred to as a club shaft plane, representing the ideal plane of travel of a shaft of the golf club during the backswing thereof.

Referring to FIG. 1, a golfer 30 has completed a backswing of a golf club 32, with the club being at the peak of the backswing, or backswing-completion position, and poised for the beginning of a downswing of the club, in anticipation of the completion of a full stroke. The club 32 includes a club shaft 34 extending between a distal end and a proximal end thereof. A club head 36 is mounted on the distal end of the shaft 34, and a grip 38 is formed about a portion of the shaft at or near the proximal end of the shaft.

The grip 38 typically extends from its outboard end disposed at the proximal end of the shaft 34 towards the distal end of the shaft, and terminates at an inboard end of the grip along an intermediate portion of the shaft. In preparation for swinging the club 32, the golfer 30 positions the golfer's hands on the grip 38 in a conventional club-gripping manner, whereby the thumb of one hand, for example, the right hand, is closer to the inboard end of the grip 38 than the thumb of the other hand. For description purposes, the thumb that is closer to the inboard end of the grip 38 is referred to herein as the inboard thumb.

Prior to initiating the backswing, the golfer 30 has placed the golfer's hands around the grip 38 in the conventional golf-gripping manner, and has addressed a golf ball 40, which is located in front of the golfer at an address, or six o'clock, position (FIG. 5), ideally to align the sweet spot of the club head 36 with the ball.

During the backswing movement of the club 32 from the six o'clock position to the backswing-completion position illustrated in FIG. 1, the golfer 30 moves the club shaft 34 through a generally "C" shaped path 42, referred to hereinafter as the club shaft plane. The ideal club shaft plane flattens and skews slightly during the downswing to create a separate and distinct ideal downswing club shaft plane. The golfer's ability to generate an ideal downswing club shaft plane is dependent on the golfer's ability to maintain an ideal backswing club shaft plane. By maintaining the club within these ideal club shaft planes, the golfer is more likely to strike the golf ball 40 with the sweet spot of the club face 52 to attain the desired trajectory and direction of the ball.

While professional golfers occasionally make errant shots, such shots are infrequent. With their inherent ability, training regimen, muscle balance and muscle memory patterns, the professionals consistently make shots that attain the desired trajectory and direction of travel of the ball 40. However, most other golfers continuously wrestle with the nagging problem of being unable to swing the golf club 32 in such a manner to bring about the lofty goal of consistent and desired ball trajectory and direction. While it is unlikely that most non-professional golfers will ever attain the inherent ability demonstrated by professional golfers, the non-professional golfers can improve their playability of the game of golf through the training of selected muscles used in the swinging of a golf club.

As a starting point, in order to attain the desired result, the golfer 30 must possess the ability to properly grip the club 32, and to maintain an appropriate stance and posture when swinging the club. Then, the golfer 30 must commit to exercising certain muscle groups, which are located in their hands, arms, shoulders and other parts of the body, necessary to provide the consistent ability to produce good golf shots under any kind of pressure.

Various embodiments of muscle trainers described herein are designed to facilitate methods of exercising and training the appropriate muscles typically utilized by the golfer 30 in the swinging of the club 32. Such exercises are designed to enhance the strength and balance of these muscles, and to fine tune the muscle memory patterns necessary for consistent production of good golf shots. The methods of exercising accomplished by the use of the muscle trainers described herein can be appreciated by an understanding of the below-described principles of the relationships between the swinging of the golf club 32 and the muscles and muscle groups involved in such swinging action.

In the two-plane-merger golf swing theory, the two planes are referred to as the club shaft plane 42 and the club face plane. With regard to the club shaft plane, it would be very difficult, if not impossible, for a human being to swing the golf club 32 through a complete stroke while keeping the club shaft 34 in one club shaft plane which is a true plane. Hence, it is correct to state that the path in which the club shaft travels is not typically a true plane. As discussed above, there are an infinite number of singular positions of the club shaft 34 along the golf club's path of travel throughout an entire swing. At each of these positions, there is a single plane that coincides with the club shaft's instantaneous direction vector. The composite of these infinite number of singular club shaft planes has been referred to herein as the club shaft plane.

The club face plane represents the position of the club face 52, in space, during the swing. Regardless of the loft of the club face, the club face plane represents the position of the club face as if the club face had zero degrees of loft, and is more appropriately defined as a true plane since it is an extension of the surface of the zero degree club face. The concept of the club face plane helps one to visualize the relationship between the movement of the club face 52 and the club shaft 34 during the swinging motion of the club.

At the address, or six o'clock, position (FIG. 5), the club face plane is ideally a vertical plane which is essentially perpendicular to the club shaft plane. During the backswing (FIG. 1), the club face 52 and the club face plane are rotated, by the golfer, about the axis of the club shaft 34 to allow for a mechanically efficient movement in which the club face plane slices through the air in an aerodynamic fashion. Ideally, for a right handed golfer in the first half of his backswing, the club face plane is rotated approximately ninety degrees in a counter-clockwise direction such that, somewhere between the 8 o'clock and 10 o'clock positions, the club face plane approximately merges, and is co-planar, with the club shaft plane 42. This approximate ninety degree rotation creates what is referred to as the merged position. At the backswing completion position and during the downswing, the club face plane remains approximately merged with the club shaft plane until just before impact when the club face plane is rotated approximately ninety degrees into an impact position, which is once again approximately perpendicular to the club shaft plane. The relationship of the club face plane and the club shaft plane during the follow-through is a mirror image of the relationship of the two planes during the backswing with an approximate remerger of the two planes occurring between the four o'clock and two o'clock positions. This action defines two-plane-merger. Of course, ideal club face plane rotation for an individual golfer may not include any instance of true two-plane-merger. Ideal club face plane rotation is essential in developing a repeatable swing pattern which is effective under pressure.

It follows that the two-plane-merger zone of the golf swing exists above the substantially horizontal line connecting the nine o'clock backswing position and the three o'clock follow-through position. The zone of the golf swing below this horizontal line is referred to as the two plane perpendicular zone or impact zone.

Figure 2:
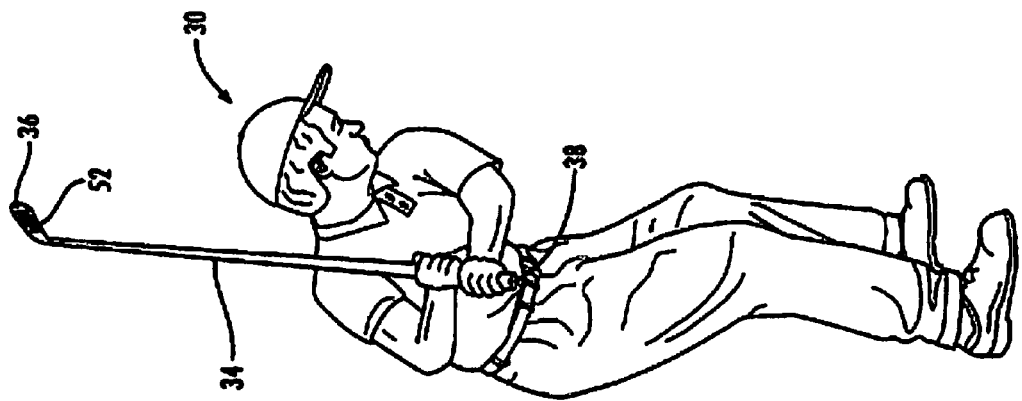
FIG. 2 is a perspective view showing a golfer with the club having nearly reached the backswing completion position, and being located undesirably behind the ideal club shaft plane of FIG. 1.

With respect to the club shaft plane 42 shown in FIG. 1, it is not uncommon for the non-professional golfer 30 to position the club shaft 32 outside of the ideal club shaft plane. Such deviation from the ideal club shaft plane is referred to herein as positioning the club shaft in front of or behind (i.e., above or below, respectively, as viewed in FIG. 1) the ideal club shaft plane. Referring to FIG. 2, the illustrated location of the club 32 indicates that the club shaft 34 is in a position which is behind the ideal club shaft plane 42 illustrated in FIG. 1. Referring to FIG. 3, the illustrated location of the club 32 indicates that the club shaft 34 is in a position which is in front of the ideal club shaft plane 42 illustrated in FIG. 1.

It is important for the golfer to minimize, and hopefully eliminate, the amount of club shaft deviation, which is behind, or in front of, the ideal club shaft plane. This requires a proper and balanced functioning of a group of opposing muscles in the golfer's hands and forearms. This muscle group is referred to as the club shaft plane opposing muscle group. The two sets of opposing muscles within the club shaft plane group are the behind-the-plane muscles and the front-of-the-plane muscles. The behind-the-plane muscles are responsible for positioning the club shaft 34 behind the ideal club shaft plane 42 and the front-of-the-plane muscles are responsible for positioning the club shaft 34 in front of the ideal club shaft plane 42. When these two sets of opposing muscles are acting in concert, where the sets are of equal strength and balance, the golfer 30 is able to swing the golf club 32 with the club shaft 34 in the ideal club shaft plane 42.

The direction of any deviation of the club shaft 34 during the swing, whether such direction is behind or in front of the ideal club shaft plane 42, can be determined by an observer of the golfer during the swing and presented to the golfer for use in taking corrective action such as that described herein. Also, a video camera can be used to record the golfer's direction of deviation, and thereafter observed by the golfer 30 in a video playback for use in taking corrective action.

Figure 5:
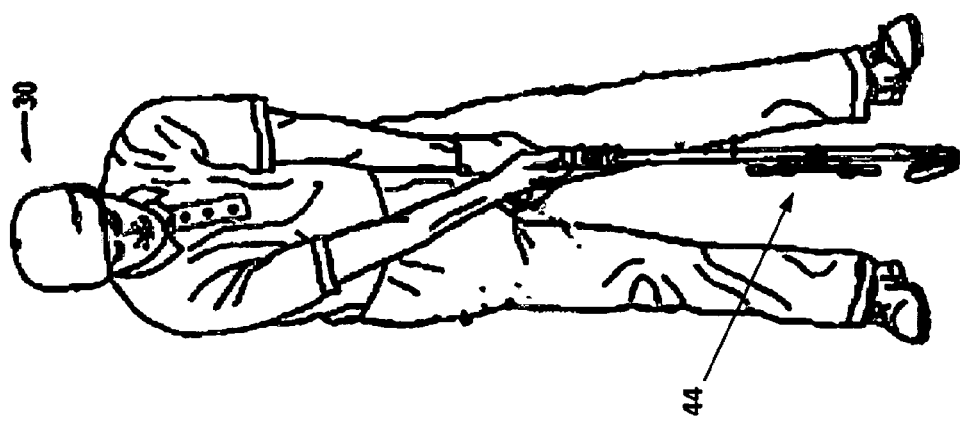
FIG. 5 is a front perspective view showing a golfer gripping a golfing implement in a six o'clock position with the muscle trainer attached in a first position in accordance with a preferred embodiment of the invention.

When the golfer 30 is standing in the address position, as illustrated in FIG. 5, the hands, wrists, arms and shoulders of the golfer form a triangle. For a right-handed golfer, the front-of-the-plane muscles are located on the back of the left hand, the outside of the left forearm, the palm of the right hand and the inside of the right forearm. The behind-the-plane muscles are the mirror image of the front-of-the-plane muscles. For a left-handed golfer, these relationships are exactly opposite.

During the swing, the front-of-the-plane muscles and the behind-the-plane muscles are, in essence, in a tug-of-war, with the two sets of muscles being at opposite ends of an imaginary rope. If the behind-the-plane muscles are overacting, or dominating, the pulling force of these muscles moves the club shaft 34 behind the ideal club shaft plane 42. The opposite effect occurs if the front-of-the-plane muscles are overacting, or dominating. In such situations, a strengthening of the dominated muscle set is required in order to preclude either set from dominating the other set, thereby bringing balance to the tug-of-war and maintaining the club shaft 34 in the ideal club shaft plane 42.

The tug-of-war between these two sets of opposing club shaft plane muscles is further complicated by the need for an approximate ninety degree rotation of the club shaft 34 and club face 52 to merge the club face plane with the club shaft plane 42 as described above. Rotation errors occur when the amount of club face plane rotation is either greater or less than the ideal amount of rotation. When the angle of club face plane rotation is less than ideal, the club face 52 is said to be in a closed or shut position. When the angle of club face plane rotation is greater than ideal, the club face 52 is said to be in an open position.

The rotation of the club shaft 34 and the club face 52 utilizes a group of opposing muscles known as the rotational opposing muscle group. When viewing a golfer's swing while standing in front of the golfer (FIGS. 5 and 6), the rotational muscle group can be divided into two sets of opposing muscles: the counter-clockwise rotational muscles and the clockwise rotational muscles.

Over action of either set of opposing rotational muscles will result in the rotation errors described above. For example, during the backswing of a right-handed golfer, over action of the clockwise rotational muscles will result in closed club face position. Over action of the counter-clockwise rotational muscles will result in an open club face position.

A third group of opposing muscles in the arms and hands controls the hinging movement of the club 32 during the swing. This group of opposing muscles is referred to as the hinge opposing muscle group and is composed of two sets of opposing muscles, the hinge loading muscles and the hinge releasing muscles.

In a face-to-face perspective with a right handed or left handed golfer, the hinge opposing muscle group can be isolated by elevating and lowering the distal end of the muscle trainer within the vertical club face plane at the six o'clock address position. While keeping the arms and the rest of the body in a relatively fixed position, maximal elevation of the distal end of the muscle trainer without rotation of the club face plane demonstrates maximum and isolated function of the hinge loading muscles. Returning the maximally elevated distal end of the muscle trainer to the six o'clock address position without rotation of the club face plane, similarly demonstrates maximum and isolated function of the hinge releasing muscles.

Figure 12:
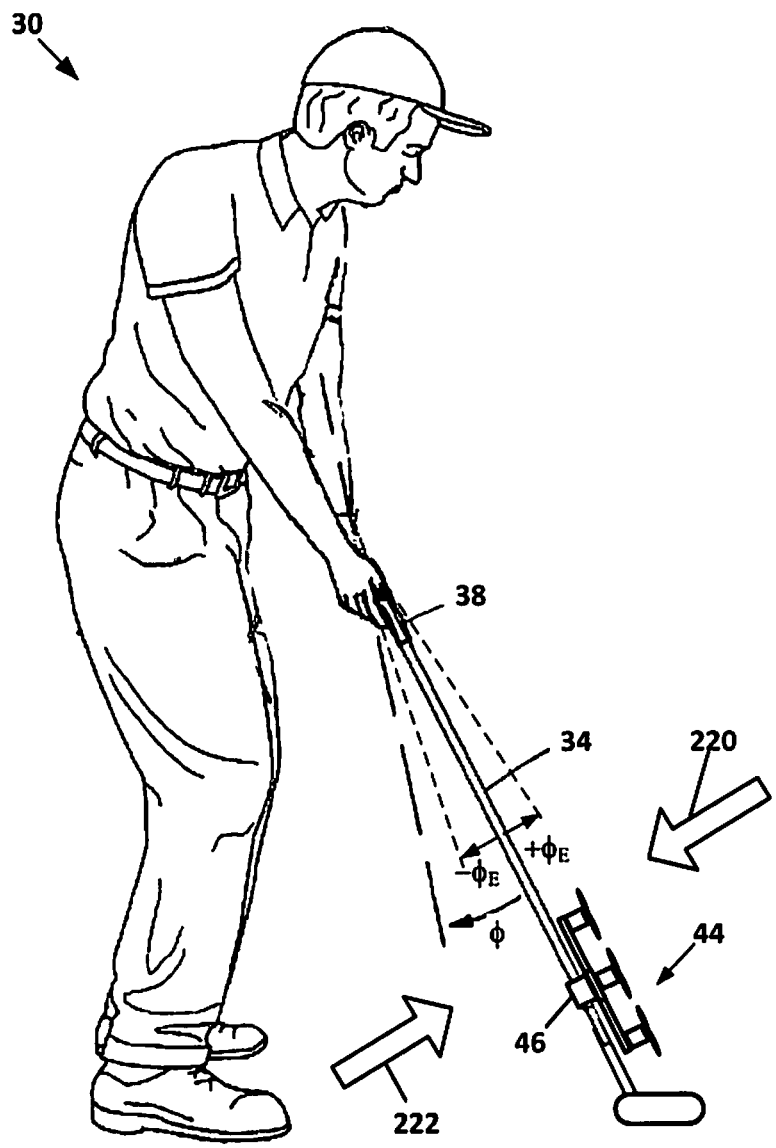
FIG. 12 is a side perspective view showing the right side of a golfer gripping the muscle trainer of FIG. 4B, with the muscle trainer in a six o'clock position and oriented to exercise hinge muscles in accordance with a preferred embodiment of the invention.

As shown in FIG. 12, for a right handed golfer, the hinge angle is the angle $\phi$ between the shaft 54 and the hatched line extending in a substantially coaxial fashion from the distal aspect of the left forearm. For a left handed golfer, the hinge angle is the angle $\phi$ between the shaft 54 and a similar imaginary line which is coaxial with the long axis of the right forearm and which extends from the distal aspect of the right forearm. Professional golfers will intentionally vary their hinge angle depending on the type of shot they are playing. Given that professional golfers will frequently flatten their downswing club shaft plane in relation to their backswing club shaft plane, it is incorrect to assume that the address hinge angle will be identical to the impact hinge angle.

To illustrate hinge errors, the intentional change in the hinge angle $\phi$ during the backswing will be set at ninety degrees. An under loaded hinge error occurs during the backswing when the change in the hinge angle $\phi$ is less than ninety degrees. An over loaded hinge error occurs during the backswing when the change in hinge angle $\phi$ is greater than ninety degrees.

An early release of the hinge angle error during the downswing occurs when the golfer allows the hinge angle $\phi$ to begin decreasing before the club shaft 34 approaches a horizontal position relative to the ground. This is one of the most common errors in golf and is referred to as casting. A late release of the hinge angle error during the downswing occurs when the golfer does not allow the hinge angle $\phi$ to begin decreasing at the appropriate hinge release point. This is a very uncommon error.

An under released hinge angle error ($+\phi_E$ in FIG. 12) occurs during the downswing when the golfer does not allow the hinge angle $\phi$ to decrease to the ideal impact hinge angle. This error plays a role in hitting thin shots and topped shots. A thin shot occurs when ball 40 is struck at a place below the sweet spot. The sweet spot is the ideal point of impact on the club face 52. A topped shot occurs when the lower edge of the club face strikes the ball above its equator, resulting in a downward trajectory of the ball into the ground. An over released hinge angle error ($-\phi_E$ in FIG. 12) occurs during the downswing when the golfer allows the hinge angle to decrease beyond the ideal impact hinge angle. This error plays a role in hitting fat shots. A fat shot occurs when the lower edge of the club face strikes the ground before the club face contacts the ball.

A fourth group of opposing muscles controls the arc of the club (32) during the swing. The arc of the swing refers to the path of the club head and is determined by the amount of extension of the hands away from the golfer's body, the timing of the wrist hinge, the amount of flexion of the left elbow of a right-handed golfer, the amount of flexion of the right elbow of a left-handed golfer, the amount of shoulder turn, the amount of hip turn, and the amount of lateral movement of the golfer's torso (also referred to as "sway"). This group of opposing muscles is referred to as the "arc opposing muscle group" and is comprised of the "arc enhancing muscles" and the "arc contracting muscles."

In a face-to-face perspective, arc can be measured as the distance from the xiphoid process (lower aspect of the sternum) to the distal aspect of the club head (36).

It follows that arc errors occur simply when the actual arc of a golfer's individualized swing is not located at the ideal arc. Over-arc errors occur when the actual arc is greater than the ideal arc. Under-arc errors occur when the actual arc is less than the ideal arc.

Along with hinging errors, arc errors play a role in hitting topped and fat shots as well as shanked shots (ball contacts the hosel where the club shaft attaches to the club head) and toed shots (ball contacts the club face outside of the sweet spot toward the distal end of the club face).

Speed is a swing variable that is influenced by the combined actions of all the opposing muscle groups in the swing. The speed of the backswing is typically slower than the speed of the downswing. Variation in the speed of the swing and the timing of the transition between the backswing and downswing create the tempo of the swing. Speed and tempo are much easier to manipulate and manage once the golfer has acquired the proper muscle memory for their ideal club shaft plane, ideal two-plane merger, ideal hinging, ideal arc, and ideal performance of other opposing muscle group actions.

While practicing, a golfer may frequently use positioning drills to improve the positioning of the club during his swinging motion. These positioning drills are usually performed at a swing speed which is much slower than the swing speed the golfer uses in actual competition. Even with imbalanced muscle groups, reasonable attempts can be made to keep the club shaft within the ideal club shaft plane and to accomplish two-plane merger during periods when the club is being swung slowly. However, it becomes increasingly difficult to accomplish these goals when the speed of the swing is increased while striking the ball during a competitive round of golf. To maintain the ideal club shaft plane, ideal rotation, ideal hinging, and ideal arc when swinging at a speed the golfer uses during actual competition, there must be an exquisite balance between the opposing sets of muscles in the club shaft plane muscle group, rotational muscle group, hinge muscle group, and arc muscle group.

Thus, in order for any golfer suffering from the muscle domination deficiencies described above to improve their ability to play the game of golf, an exercise program to balance the four opposing muscle groups is an absolute necessity. Given that a golfer wishes to embark on such an exercise program, the key is to be able to address the specific needs of the muscles of the four groups in such a way that the ideal swing movements and the resultant ideal ball flight patterns are attainable.

The reversibly attachable muscle trainer 44 described herein is designed to exercise the muscles of the four muscle groups, while placing a greater effort in strengthening the dominated, or weaker, sets of opposing muscles. In this manner, the dominating sets of muscles are exercised to retain the muscle tone thereof, while at the same time the dominated sets of muscles are worked and exercised more vigorously to improve the muscle tone thereof, and to bring the four muscle groups into a balanced condition. Further, by working and exercising the four muscle groups together, enhanced muscle memory patterns are developed there between.

Once the four muscle groups have attained parity in strength, balance, and memory patterns, the golfer 30 can maintain the club shaft 34 more consistently within the ideal club shaft plane 42, perform proper rotation of the club face plane, perform proper hinging action, and perform proper arc to attain desired trajectory, direction, and distance of travel of the ball 40.

Figure 13:
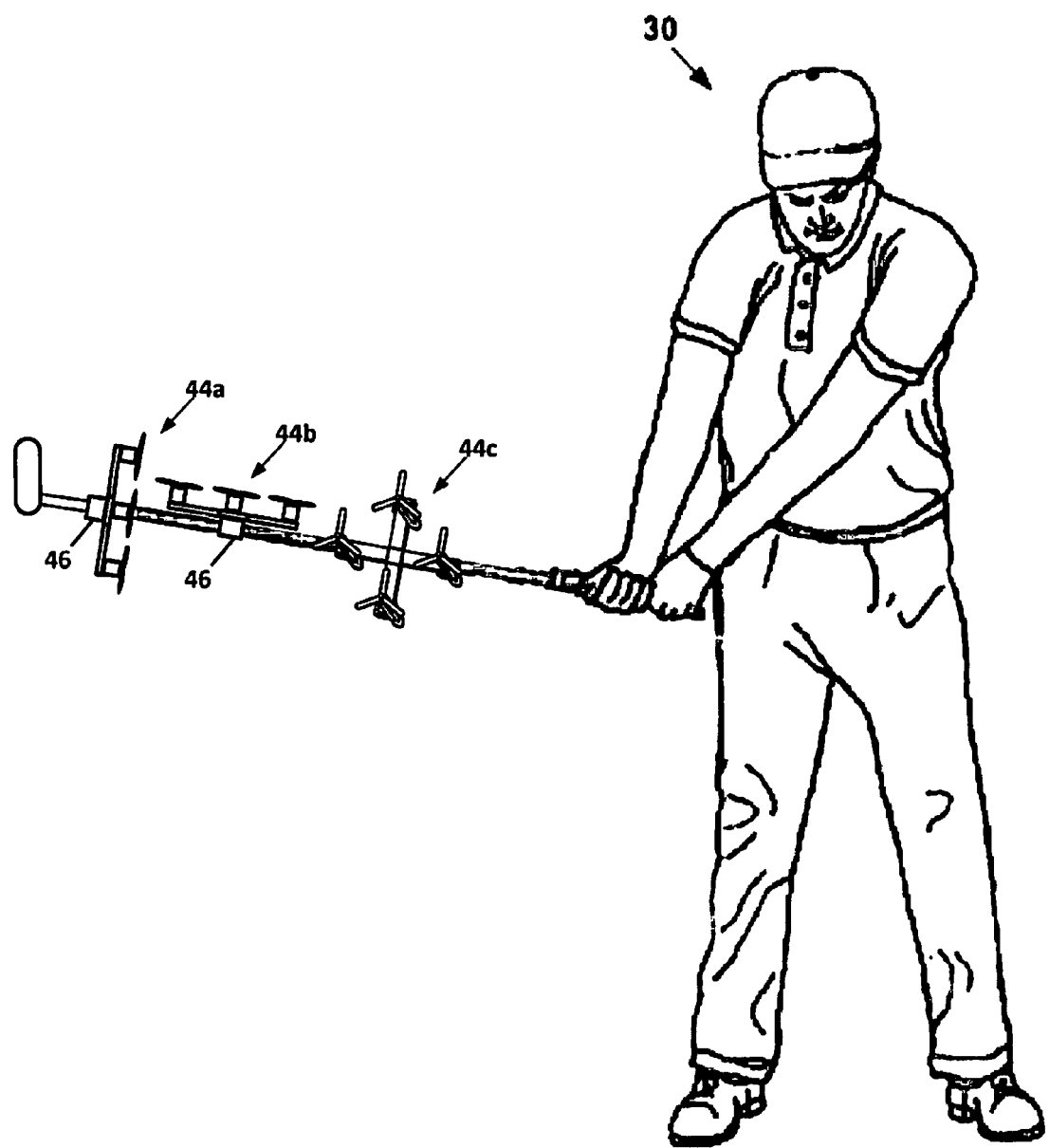
FIG. 13 depicts a front perspective view of a golfer gripping an embodiment of the muscle trainer having multiple force generators for generating forces in multiple directions.

As shown in FIGS. 4A and 4B, preferred embodiments of the reversibly attachable muscle trainer 44 include four force generators 370a, 370b, 370c, and 370d, such as the commercially available QuadPod by Snelflight, Ltd, 18 Kirkwood Drive, Durham, DH1 4ff. In this embodiment, the four force generators 370a-370d comprise four electric motors with propellers attached at opposing ends of carbon fiber arms in a cross arrangement. As shown in FIGS. 12 and 13, the four arms are connected to a bracket assembly 46 that attaches the muscle trainer 44 to the shaft 34 of the club 32. The bracket assembly provides for attachment of the muscle trainer 44 in various angular orientations with respect to the shaft 34.

A three-axis accelerometer is attached to the distal end of each of the arms. Preferably, each of the four accelerometers A1, A2, A3, and A4 is located on the opposite side of the bracing arm from the motor, and may be attached by sharing the screws that attach the motor to the arm. In one embodiment, the accelerometers A1-A4 are model number DE-ACCM3D manufactured by Dimension Engineering, 899 Moe Drive #21, Akron, Ohio, 44310. The trainer 44 also preferably includes a wireless radio transceiver, a controller, and rechargeable batteries. A functional block diagram of the components of the trainer 44 are depicted in FIG. 18.

Figure 18:
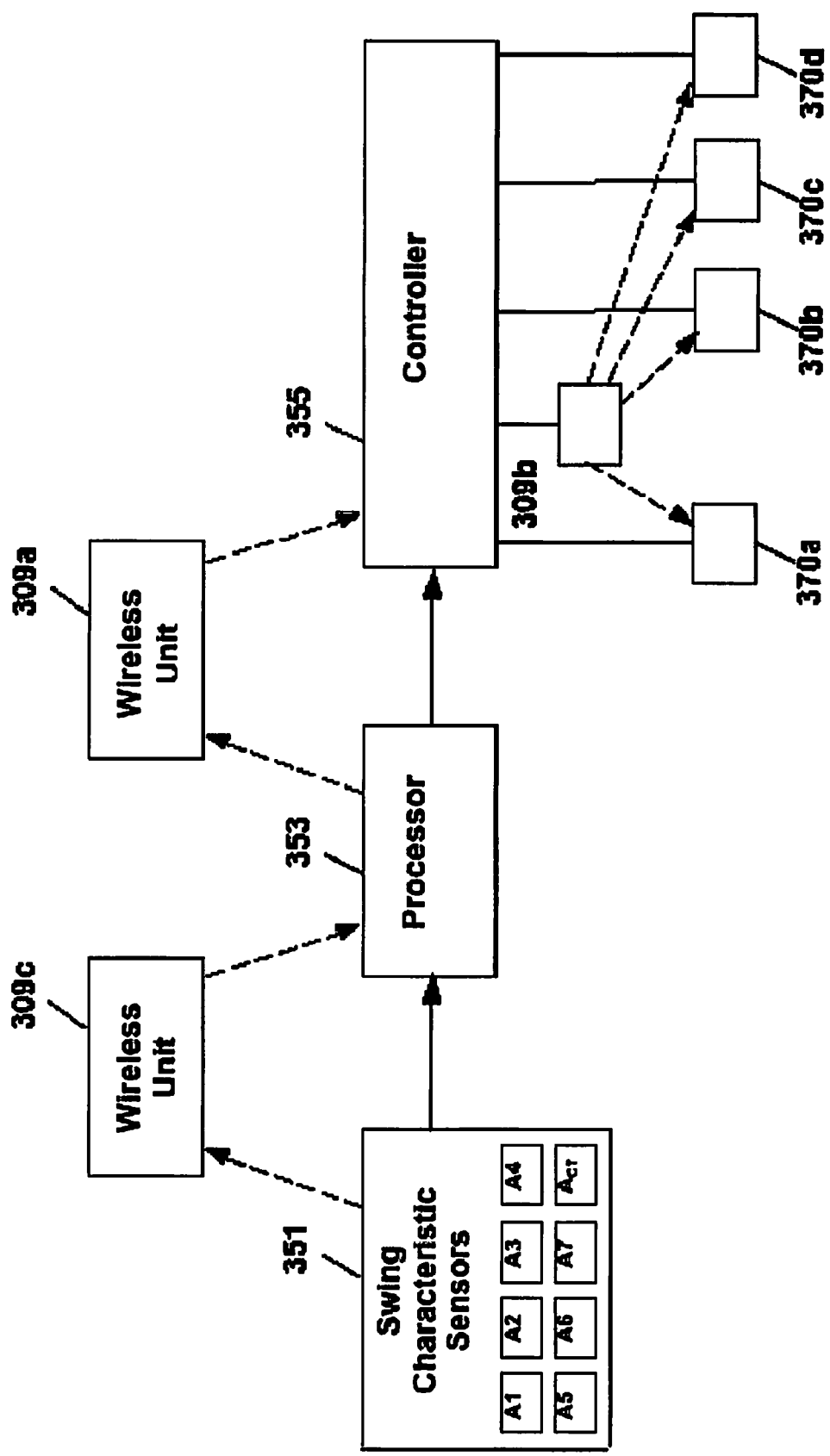
FIG. 18 depicts a functional block diagram of a swing trainer system according to a preferred embodiment of the invention.

As shown in FIG. 18, this arrangement allows a remote processor 353 to receive positional data from the accelerometers A1-A4 and other accelerometers described hereinafter. The processor 353 then uses that data to control the muscle trainer 44 and, thereby, generate training forces on the implement being moved by the person being trained.

In the following example of use of the muscle trainer 44 and the practice of a method of exercising the club shaft plane opposing muscle group, the front-of-the-plane muscles are the set of dominated muscles.

Figure 6:
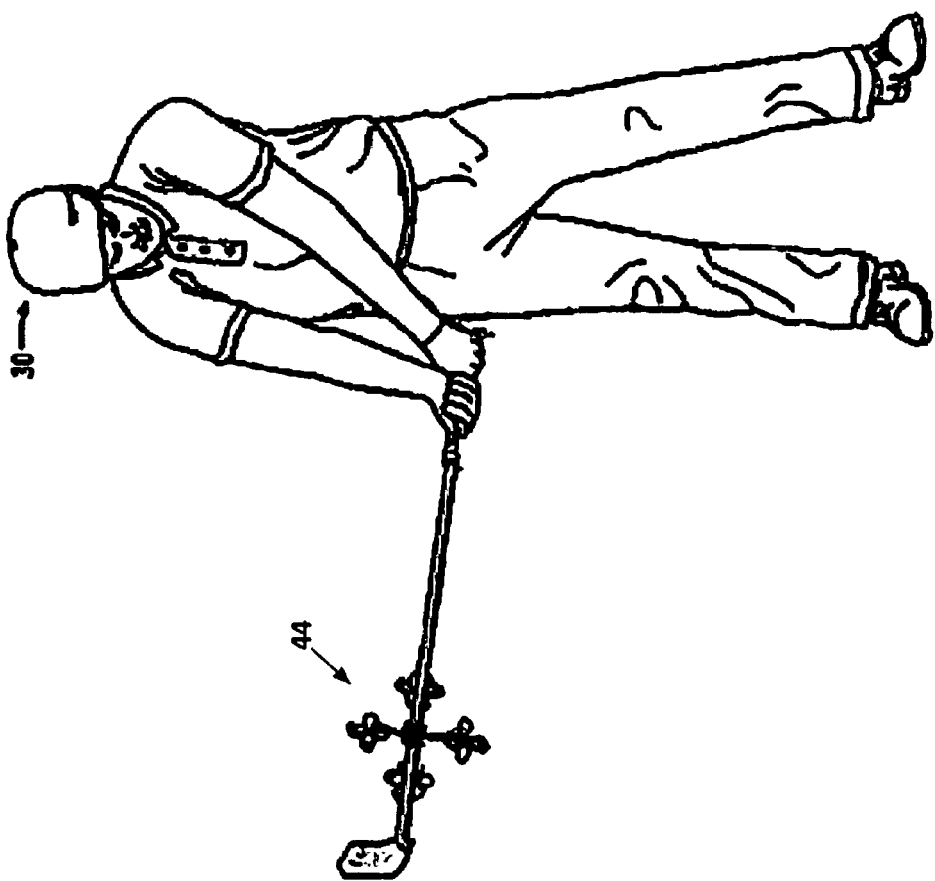
FIG. 6 is a front perspective view showing a golfer in a nine o'clock "toe up" position, relative to the six o'clock position of FIG. 5 while gripping the golfing implement with the muscle trainer attached in the first position in accordance with a preferred embodiment of the invention.

As depicted in FIGS. 5 and 6, the golfer 30 swings the conventional golf club 32 with the muscle trainer 44 attached so that all four force generators 370a-370d are located in the club face plane. This first attachment position provides maximal training forces for either the front-of-the-plane muscles or behind-the-plane muscles.

Initially, the golfer 30 (preferably with the guidance of a golf teaching professional) places the club in multiple ideal club shaft plane positions throughout the swing. The positional data from the accelerometers is transmitted to the processor 353 that uses this positional data to generate and store a reference ideal club shaft plane for the golfer 30.

The golfer 30 then performs a full swing of the golf club 32 in the process of hitting a golf ball toward a target. As stated above, the club shaft plane will deviate in a behind-the-plane direction and the trainer 44 will transmit that error data to the processor 353. The processor 353 will then compare the error data to the stored ideal data and generate control signals that are transmitted to the trainer 44. The control signals cause all four force generators 370a-370d to produce forces that augment the behind-the-plane error movement. This exercises the dominated front-of-the plane muscles until the error movement is corrected.

If the golfer's front-of-the-plane muscles are the dominating muscles, the club shaft plane will deviate in a front-of-the-plane direction and the trainer 44 will deliver that error data to the processor 353. The processor 353 will then compare the error data to the stored ideal data and generate control signals that cause all four force generators 370a-370d to produce forces that augment the front-of-the-plane error movement. This exercises the dominated behind-the-plane muscles until the error movement is corrected.

Alternative force feedback methods include guidance feedback and noisy feedback. Guidance feedback involves producing forces that minimize any behind-the-plane or front-of-the-plane error movement and push the golf club back toward the ideal club shaft plane. Noisy feedback involves producing random training forces on the club.

In the following example of use of the muscle trainer 44 and the practice of a method of exercising the hinge opposing muscle group, the hinge loading muscles are the set of dominated muscles.

Figure 8:
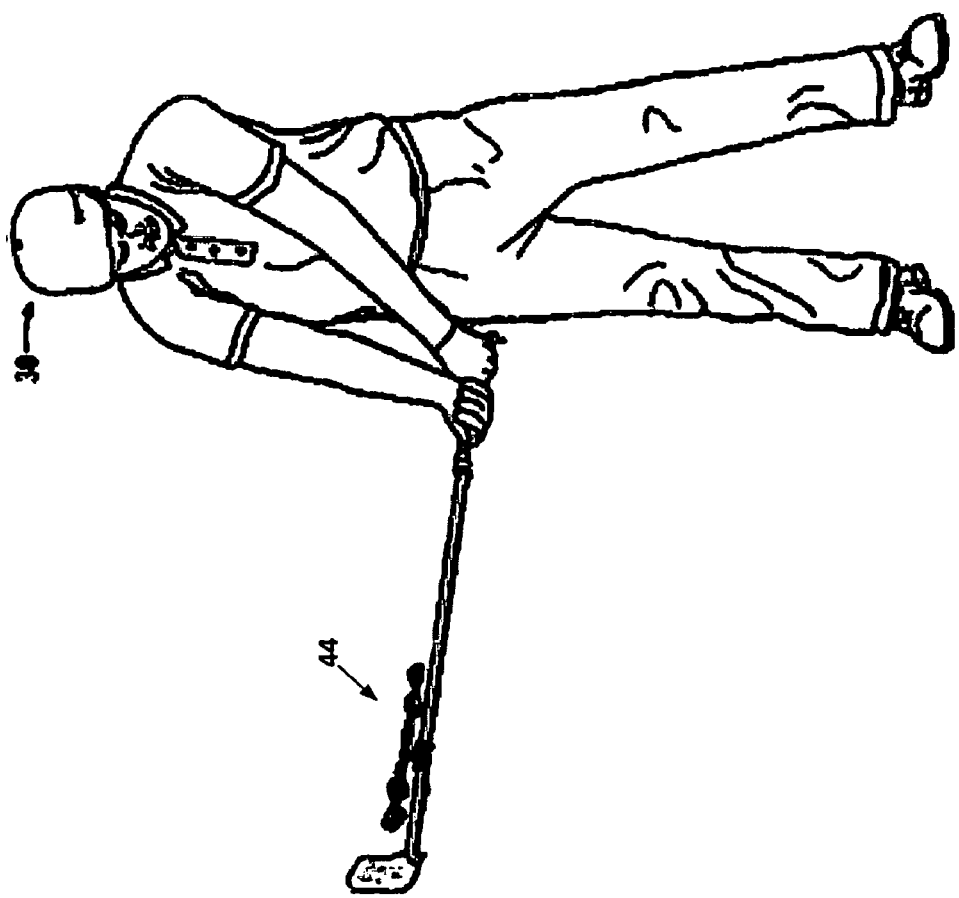
FIG. 8 is a front perspective view showing a golfer in a nine o'clock "toe up" position, relative to the six o'clock position of FIG. 7 while gripping the golfing implement with the muscle trainer of FIG. 4A attached in the second position in accordance with a preferred embodiment of the invention.
Figure 7:
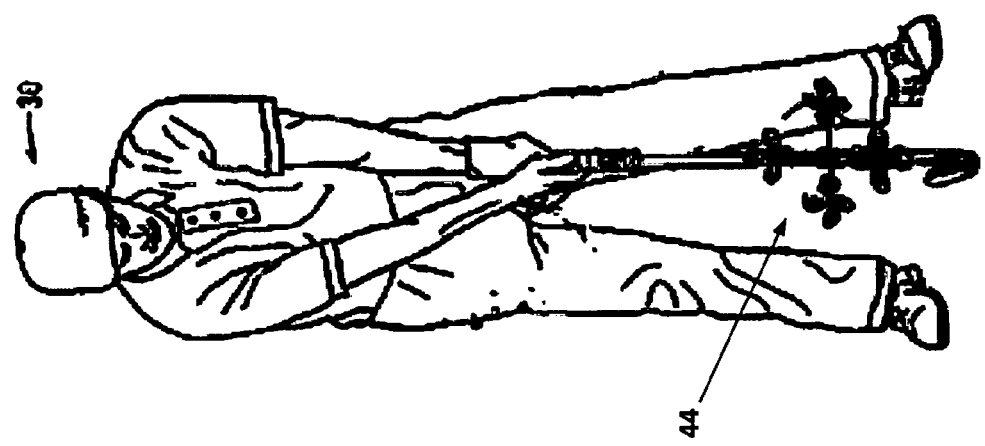
FIG. 7 is a front perspective view showing a golfer gripping a golfing implement in a six o'clock position with the muscle trainer of FIG. 4A attached in a second position in accordance with a preferred embodiment of the invention.

As depicted in FIGS. 7 and 8, the golfer 30 is swinging the conventional golf club 32 with the muscle trainer 44 attached in a position that is rotated ninety degrees about the club shaft from the position depicted in FIGS. 5 and 6. This second attachment position provides maximal training forces for either the hinge loading muscles or the hinge releasing muscles.

Initially, the golfer 30 (preferably with the guidance of a golf teaching professional) places the club in multiple ideal hinge positions throughout the swing. The trainer 44 transmits this positional data to the processor 353. The processor 353 uses this positional data to generate and store a reference ideal hinge motion for the golfer 30.

The golfer 30 then performs a full swing of the golf club 32 in the process of hitting a golf ball toward a target. As stated above, the hinge motion will deviate in an under-loaded hinge direction and the trainer 44 will transmit that error data to the processor 353. The processor 353 will then compare the error data to the stored ideal data and generate control signals causing all four force generators 370a-370d to produce forces that augment the under-loaded hinge error movement. This exercises the dominated hinge loading muscles until the error movement is corrected.

If the golfer's hinge loading muscles are the dominating muscles, the hinge motion will deviate in an over-loaded hinge direction and the trainer 44 will deliver that error data to the processor 353. The processor 353 will then compare the error data to the stored ideal data and generate control signals to cause all four force generators 370a-370d to produce forces that augment the over-loaded hinge error movement. This exercises the dominated hinge releasing muscles until the error movement is corrected.

Alternative force feedback methods include guidance feedback and noisy feedback. Guidance feedback involves producing forces that minimize any under-loaded hinge or over-loaded hinge error movement and push the golf club back toward the ideal hinge position. Noisy feedback involves producing random training forces on the club.

In the following example of use of the muscle trainer 44 and the practice of a method of exercising the rotational opposing muscle group, the counter-clockwise rotational muscles are the set of dominated muscles.

As depicted in FIGS. 5-8, the golfer 30 is swinging the conventional golf club 32 with the muscle trainer 44 attached in a club shaft plane training orientation (FIGS. 5 and 6) and a hinge training orientation (FIGS. 7 and 8). While these attachment positions provide maximal training forces for either the club shaft plane or the hinge, each position can also provide training forces for rotation. As shown in FIG. 4A, the two force generators 370b and 370d on the two opposing arms extending perpendicular to the club shaft can create rotational training forces when they are simultaneously activated in opposing directions.

Initially, the golfer 30 (preferably with the guidance of a golf teaching professional) places the club in multiple ideal rotational positions throughout the swing, and the trainer 44 transmits the corresponding positional data to the processor 353. The processor 353 uses this positional data to generate and store a reference ideal rotation for golfer 30.

The golfer 30 then performs a full swing of golf club 32 in the process of hitting a golf ball toward a target. As stated above, rotation will deviate in a clockwise direction and the trainer 44 will transmit that error data to the processor 353. The processor 353 then compares the error data to the stored ideal data and generates control signals to cause the two force generators 370*b* and 370*d* to produce forces that augment the clockwise rotation error movement. This exercises the dominated counter-clockwise rotational muscles until the error movement is corrected.

If the golfer's counter-clockwise rotational muscles are the dominating muscles, rotation will deviate in a counter-clockwise direction and the trainer 44 will transmit that error data to the processor 353. The processor 353 will then compare the error data to the stored ideal data and generate control signals to cause the force generators 370*b* and 370*d* to produce forces that augment the counter-clockwise rotation error movement. This exercises the dominated clockwise rotational muscles until the error movement is corrected.

Alternative force feedback methods include guidance feedback and noisy feedback. Guidance feedback involves producing forces that minimize any clockwise rotation or counter-clockwise rotation error movement and push the golf club back toward the ideal rotation position. Noisy feedback involves producing random training forces on the club.

In the following example of use of the muscle trainer 44 and the practice of a method of exercising the arc opposing muscle group, the arc enhancing muscles are the set of dominated muscles.

Figure 10:
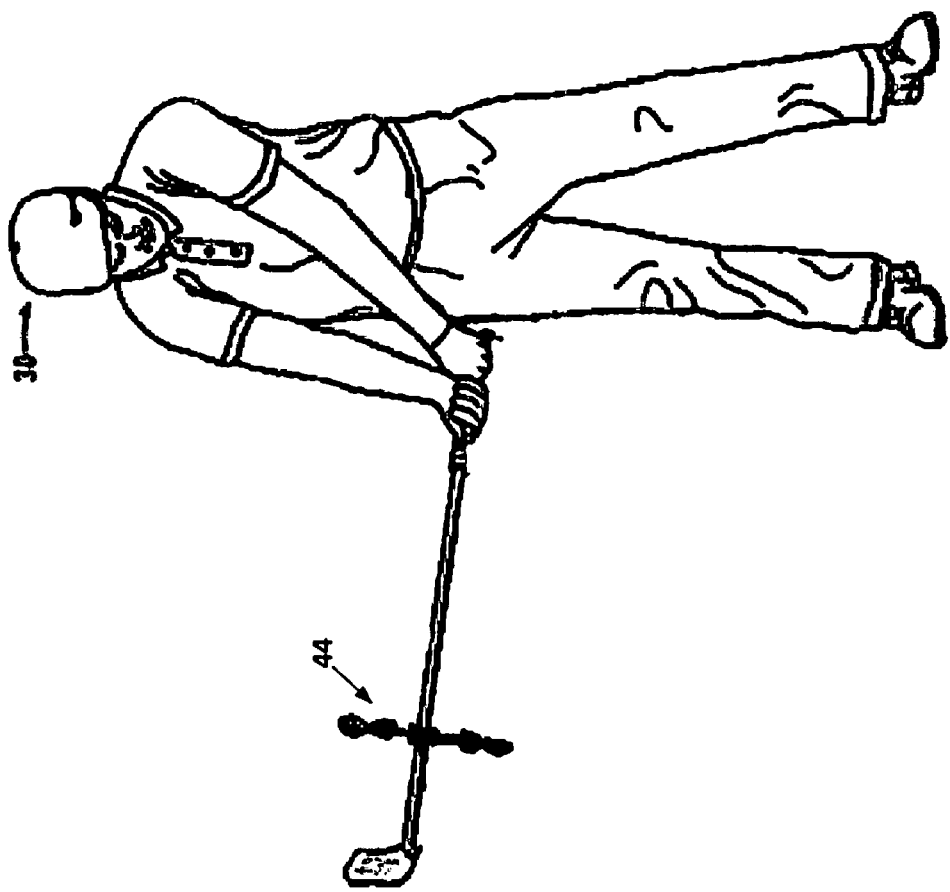
FIG. 10 is a front perspective view showing a golfer in a nine o'clock "toe up" position, relative to the six o'clock position of FIG. 9 while gripping the golfing implement with the muscle trainer of FIG. 4B attached in the third position in accordance with a preferred embodiment of the invention.
Figure 9:
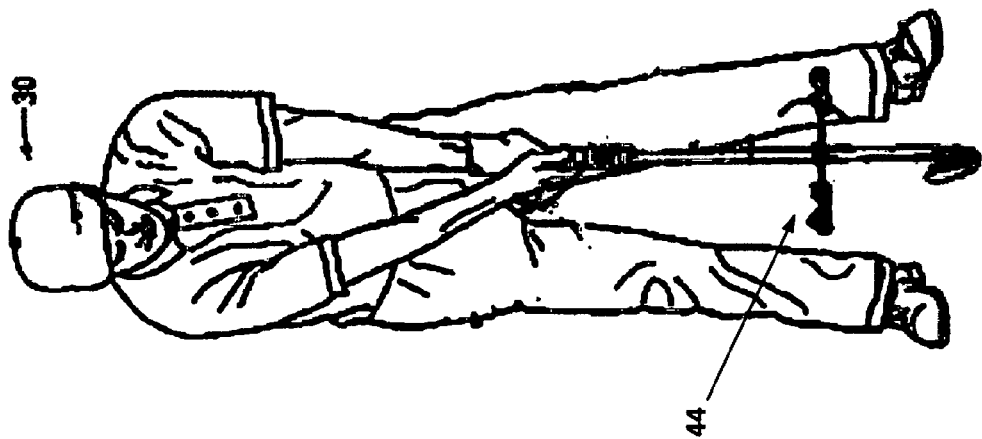
FIG. 9 is a front perspective view showing a golfer gripping a golfing implement in a six o'clock position with the muscle trainer of FIG. 4B attached in a third position in accordance with a preferred embodiment of the invention.
Figure 11:
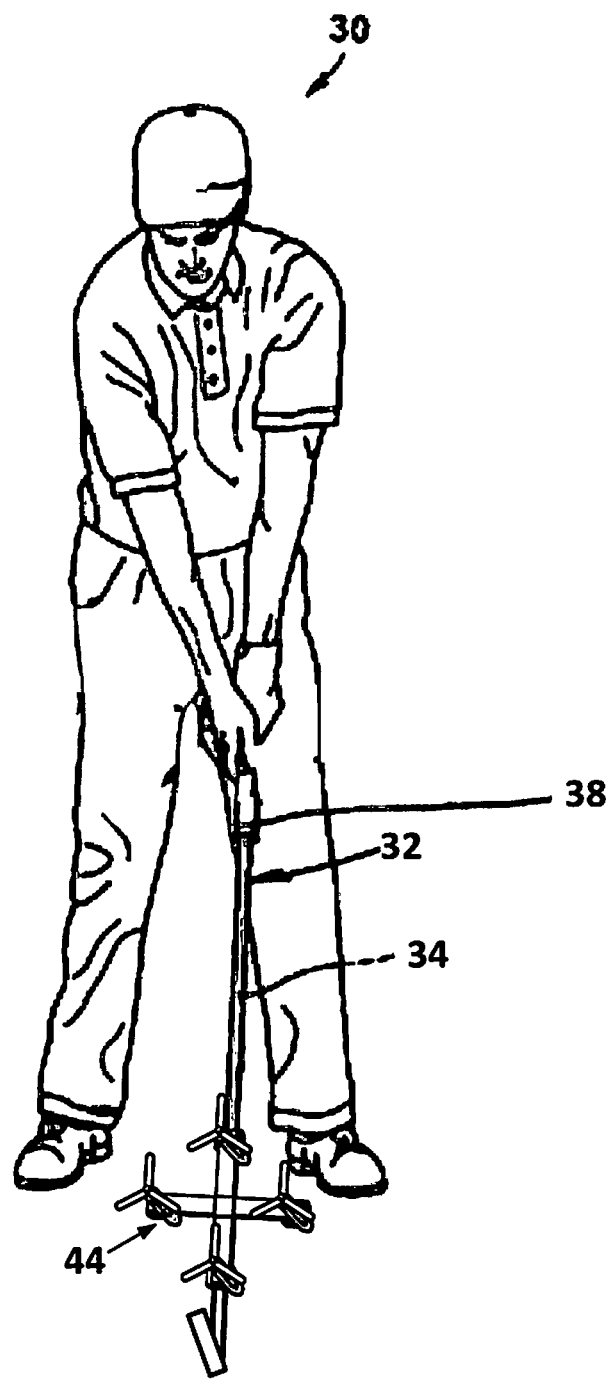
FIG. 11 is a front perspective view showing a golfer gripping the muscle trainer of FIG. 4B, with the muscle trainer in a six o'clock position and oriented to exercise hinge muscles in accordance with a preferred embodiment of the invention.

As depicted in FIGS. 9 and 10, the golfer 30 is swinging the conventional golf club 32 with the muscle trainer 44 attached in a position wherein the plane of the four propellers is perpendicular to the club shaft. This third attachment position (shown in FIG. 4B) provides maximal training forces for either the arc enhancing muscles or the arc contracting muscles.

Initially, the golfer 30 (preferably with the guidance of a golf teaching professional) places the club in multiple ideal arc positions throughout the swing. The trainer 44 transmits this positional data to the processor 353 that uses this positional data to generate and store a reference ideal arc motion for golfer 30.

The golfer 30 then performs a full swing of golf club 32 in the process of hitting a golf ball toward a target. As stated above, the arc motion will deviate in a contracted arc direction and the trainer 44 will transmit that error data to the processor 353. The processor 353 will then compare the error data to the stored ideal data and generate control signals to cause all four force generators 370*a*-370*d* to produce forces that augment the arc contracting error movement. This exercises the dominated arc enhancing muscles until the error movement is corrected.

If the golfer's arc enhancing muscles are the dominating muscles, the arc will deviate in an enhanced arc direction and the trainer 44 will transmit that error data to the processor 353. The processor 353 will then compare the error data to the stored ideal data and generate control signals to cause all four force generators 370*a*-370*d* to produce forces that augment the arc enhancing error movement. This exercises the dominated arc contracting muscles until the error movement is corrected.

Alternative force feedback methods include guidance feedback and noisy feedback. Guidance feedback involves producing forces that minimize any contracted arc or enhanced arc error movement and push the golf club back toward the ideal arc position. Noisy feedback involves producing random training forces on the club.

FIG. 13 depicts the simultaneous use of three muscle trainers 44*a*, 44*b*, and 44*c*. This arrangement allows for simultaneous training of the club shaft plane, hinge, rotation, and arc muscles.

With dedicated exercising and use of muscle trainer 44 over a period of time, the golfer 30 will obtain a proper club shaft plane, proper hinge, proper rotation, and proper arc muscle memory to the extent that the action of the hands, wrists and arms can be thought of as being on automatic pilot. This allows the golfer 30 to easily concentrate on other essentials such as swing speed, tempo, weight shift, and driving the downswing with the larger muscles of the torso.

The game of golf, and particularly the swinging of a golf club in playing the game of golf, has been used above as a centerpiece to describe the principles of the invention covered herein, as practiced by the use of the various embodiments and versions of the above-described muscle trainer, and the methods of exercising. However, the muscle trainer, and the methods of exercising described above can also be used to enhance the muscle memory associated with other sports games and activities. For example, games such as baseball, softball, tennis, racket ball, weight lifting and weight throwing, use of hand held weapons, use of handheld video gaming implements, and use of automated reality handheld implements involve action between competing muscles to obtain balance and direction in the particular endeavor.

Indeed, the muscle trainer and the methods of exercising described herein can be used in many walks of life unrelated to the activities listed above. For example, the swinging and directing of a maul, a hammer or an axe into engagement with a target object requires separate muscle groups. In this regard, the word "implement" as used herein may refer to sports-related implements, such as golf clubs, baseball and softball bats, tennis and racket ball rackets, weight lifting and weight throwing devices, handheld weapons, handheld video gaming implement, handheld automated reality implements, labor-related implements, such as mauls, hammers or axes, and any other handheld implement used in the performance of a useful or recreational functions. Also, the word "shaft" as used herein may refer to any elongate portion of a sports-related, weapon-related, handheld video gaming-related or automated reality-related, or labor-related implement, including but not limited to any of the implements listed above. Specifically, as the scale of technology diminishes, reversibly attachable motion sensing force generators may be used for motion training with eating utensils, tooth brushes, writing pens, paint brushes, and surgical instruments.

Figure 32:
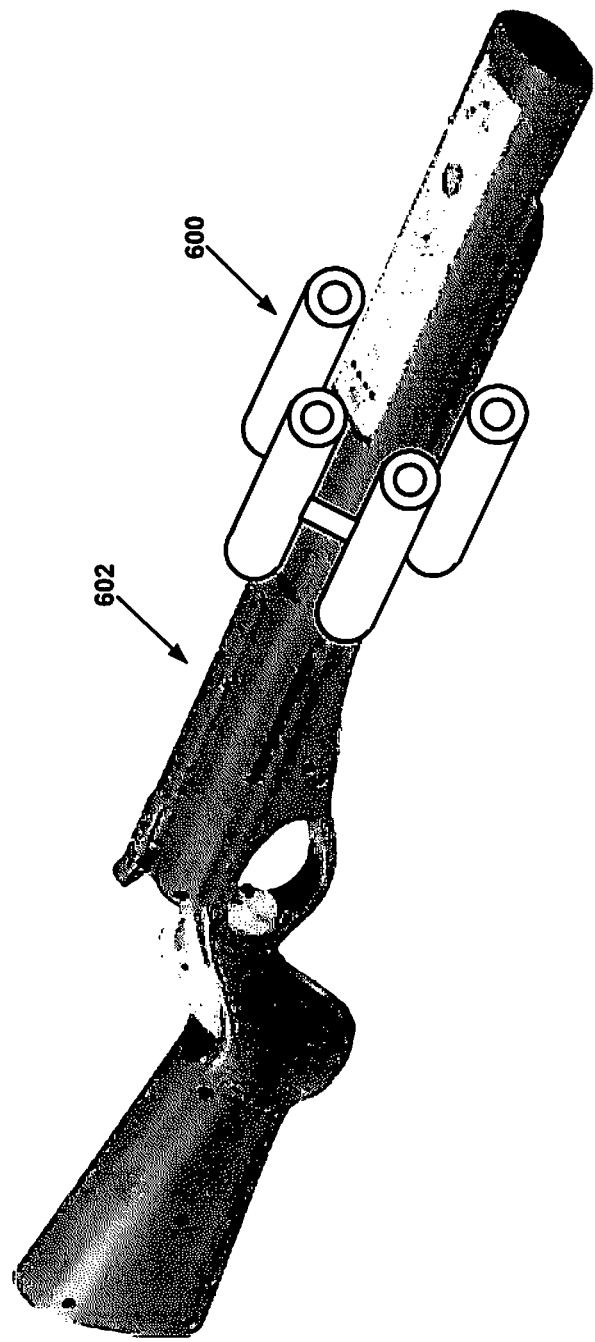
FIG. 32 depicts a gun simulator with a quad-propulsion assembly.

Even though error augmentation feedback, guidance feedback, and noisy feedback are detailed herein, various other feedback methods could be employed in using the reversibly attachable muscle trainer(s) including, but not limited to, providing augmented reality forces on hand-held video gaming implements and hand-held automated reality implements. An example is depicted in FIG. 32 in which a quad-propulsion muscle training apparatus 600 is attached to a video gaming gun simulator 602 such as may be used with a Wii video gaming system. Positioned as if for the arc training mentioned described above, the apparatus 600 can provide forces pushing toward the body of the person holding the simulator 602, thereby simulating gun recoil each time the trigger is pulled. If the force generators of the apparatus 600 are jet or plasma thrusters then an element of augmented projectile discharge occurs simultaneously with the recoil forces. The angle of the force generators may be adjusted to provide various realistic angles of simulated recoil. There are many other real world simulating forces and effects that could be generated in a similar fashion using the apparatus.

States of Motion in Two-Plane-Merger Zone and Impact Zone of Golf Swing

FIG. 14 represents nine potential states of motion in the two-plane-merger zone of the golf swing. For the backswing, the nine squares refer only to the portion of the backswing that extends from the point at which club face plane rotation has ended (eight o'clock to ten o'clock) to the point of completion of the backswing (three o'clock toe down). The central probability square (I/M) represents a state of ideal motion for this segment of the backswing in which the golf club is located in an ideal club shaft plane and ideal two-plane-merger is being maintained. Given that ideal rotation for a given golfer may involve limited to no instance of two-plane-merger, "M" could also be taken to stand for "ideal rotation." The other eight probability squares represent states of improper motion.

For the downswing, the nine squares of FIG. 14 refer only to the portion of the downswing which extends from the backswing completion position (three o'clock toe down) to the point at which club face plane rotation begins its rapid acceleration phase in the impact zone. The impact zone extends from around the nine o'clock downswing club shaft position through the three o'clock follow-through club shaft position. In the downswing segment between three o'clock toe down and nine o'clock, most professional golfers tend to maintain the same degree of rotation they were in during the same segment of their backswing (nine o'clock to three o'clock toe down).

As rapid club face plane rotation begins in the impact zone, a second probability diagram, shown in FIG. 15, represents the position of the club face plane (x axis) and club shaft plane (y axis) at impact. Ideally, the club face plane should return to a position ninety degrees away from the club shaft plane at impact. This position is referred to as the squared position or being square at impact (+). The other two impact positions are the slice position (S) and the hook position (H). The slice position refers to the state of motion in which club face plane rotation has fallen short of the square position. This position is also referred to as the open club face position at impact. The hook position refers to the state of motion in which club face plane rotation has progressed past the square position. This position is also referred to as the closed club face position at impact.

For a stroke in which the club is swung into the impact zone behind the ideal club shaft plane, the club face will approach the ball on a path which is too inside to outside the target line. This non-ideal inside to outside the target line approach can also be called non-ideal inside out and in this instance means the clubface approaches the ball from too far inside the target line, crosses the target line at impact, then moves too far outside the target line after impact. Since this is an error state of motion, it can also be called error inside out (EIO).

For a stroke in which the club is swung into the impact zone in the ideal club shaft plane, the club face will approach the ball on a path which is just slightly inside out. This state of motion is called ideal inside out (IIO).

For a stroke in which the club is swung into the impact zone in front of the ideal club shaft plane, the club face will approach the ball on a path which is outside in. This means the club face approaches the ball from outside the target, crosses the target line at impact, then moves inside the target line after impact. This state of motion is called error outside in (EOI). EOI includes the potential path in which the club face approaches the ball on a path down the target line.

The nine states of motion represented in the nine probability squares of FIG. 15 produce shots referred to as follows: EIO/S→"push slice"; EIO/+→"push"; EIO/H→"push hook"; IIO/S→"fade"; IIO/+→"draw"; IIO/H→"hook"; EOI/S→"pull slice"; EOI/+→"pull"; and EOI/H→"pull hook". Obviously, a straight shot has been left out and for good reason. A perfectly straight shot means a square club face has approached the ball on the target line and stayed on the target line through impact. For a full stroke, this straight trajectory is very hard to reproduce and is not usually a goal for the professional golfer. Professional golfers like to see shape in their shots and usually prefer either a fade or a draw as their standard trajectory. They make adjustments in their swings to produce different and more dramatic shape as the specific shot warrants.

The probability grids of FIGS. 14 and 15 can be superimposed on one another as the state of motion located in a certain square in FIG. 14 will usually produce the state of motion located in the same square in FIG. 15.

Figure 16:
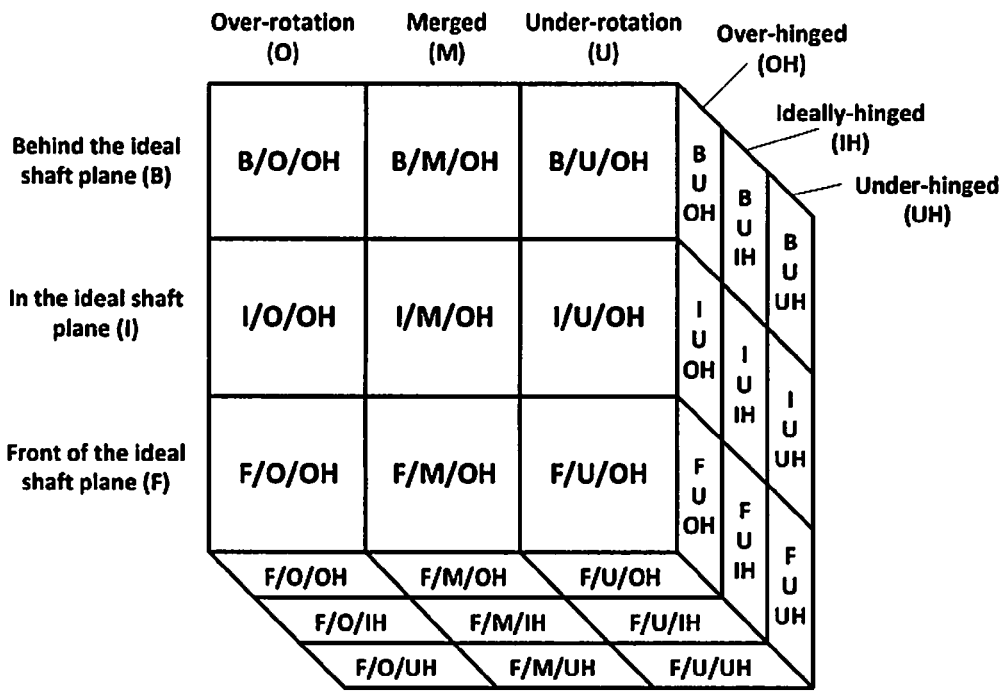
FIG. 16 depicts a probability cube representing twenty-seven states of motion in the two-plane-merger zone of the golf swing.
Figure 17:
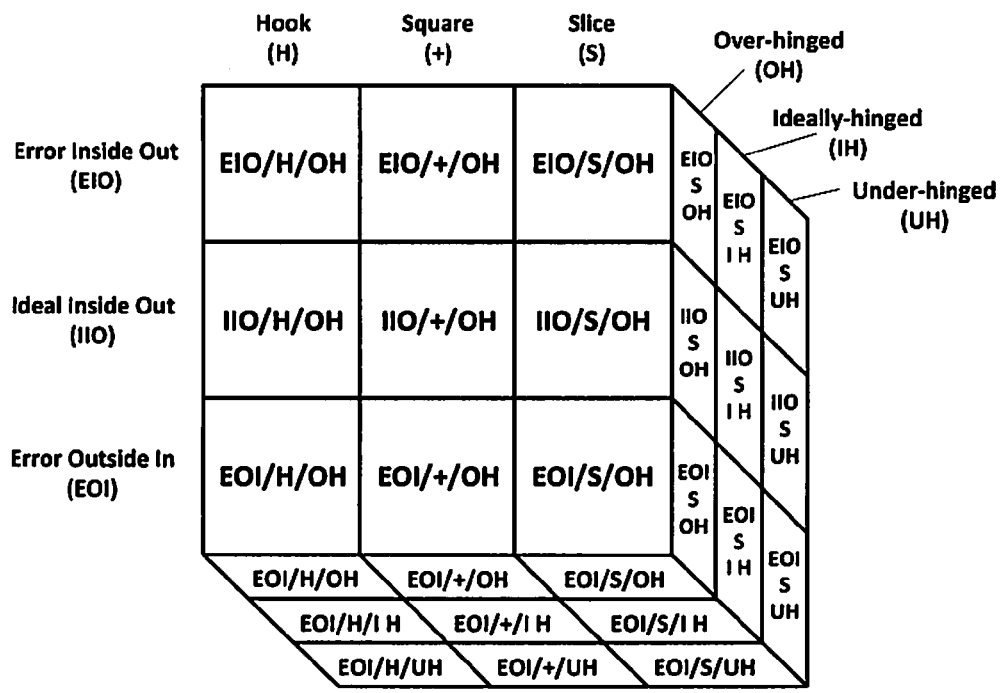
FIG. 17 depicts a probability cube representing twenty-seven states of motion in the impact zone of the golf swing.

Furthermore, as shown in FIGS. 16 and 17, the probability grids of FIGS. 14 and 15 can be converted into probability cubes by adding a z-axis representing the three states of hinging at any point in the swing. Under-hinged (UH) signifies that the hinge angle $\phi$ is less than ideal at a given point in the swing ($-\phi_E$ in FIG. 12 beyond negative hinge tolerance). Ideally-hinged (IH) signifies that the hinge angle $\phi$ is ideal at a given point, or is at least within the $-/+\phi_E$ tolerance. Over-hinged (OH) signifies that the hinge angle $\phi$ is greater than ideal at a given point ($+\phi_E$ in FIG. 12 beyond positive hinge tolerance). Ordering these three states of hinge motion along the z-axis in the same way (UH, IH, OH) provides twenty-seven states of potential motion at any point in the two-plane-merger zone and in the impact zone. The ideal state of motion is in the center of each probability cube: I/M/IH for the two-plane-merger zone and IIO/+/IH for the impact zone.

The three states of arc (under-arced=UA, ideally-arced=IA, and over-arced=OA) can also be added to the probability cubes in FIGS. 16 and 17. This would provide eighty-one states of potential motion at any point in the two-plane merger zone and in the impact zone. The ideal state of motion becomes I/M/IH/IA for the two-plane-merger zone and IIO/+/IH/IA for the impact zone.

Other error states of motion which are not represented in FIGS. 14-17 include but are not limited to those related to the speed of the swing and coordination of foot, leg, and torso movements with the above club positions. More complex probability matrices can be developed from these additional states of motion. If any single error state of motion or any combination of error states of motion exists at any point in time in a golfer's swing, the implement and its various biofeedback options can be used to correct the errors. Of course, an ideal golf swing begins with instruction and attainment of an ideal grip, alignment, stance and posture. Grip, alignment, stance and posture errors will negatively impact the attempt to attain the ideal states of motion described above.

Theories representing different concepts of what an "ideal golf swing" should look like can be represented by their own unique probability diagrams. Regardless of the nature of the "ideal golf swing" sought after by the golfer and/or their teaching professional, the present invention can be used to attain it.

Sensing Swing Errors

As discussed above with reference to FIGS. 4A and 4B, preferred embodiments of the muscle trainer 44 include one or more swing characteristic sensors attached to the carbon fiber frame for sensing direction and velocity characteristics of golf club 32 to which it is attached for muscle training exercises. (See FIGS. 5-10.) In one preferred embodiment of the invention, the swing characteristic sensors 351 comprise accelerometers that sense acceleration of the club shaft 34 and club head 36 in three orthogonal axes. As shown in FIGS.

4A and 4B, the accelerometers are preferably packaged in accelerometer assemblies A1, A2, A3, and A4 positioned near the distal end of each of the four straight bracing carbon fiber arms of the muscle trainer 44. In this manner, three-dimensional acceleration vectors may be measured with respect to at least four points on the muscle trainer.

Figure 20:
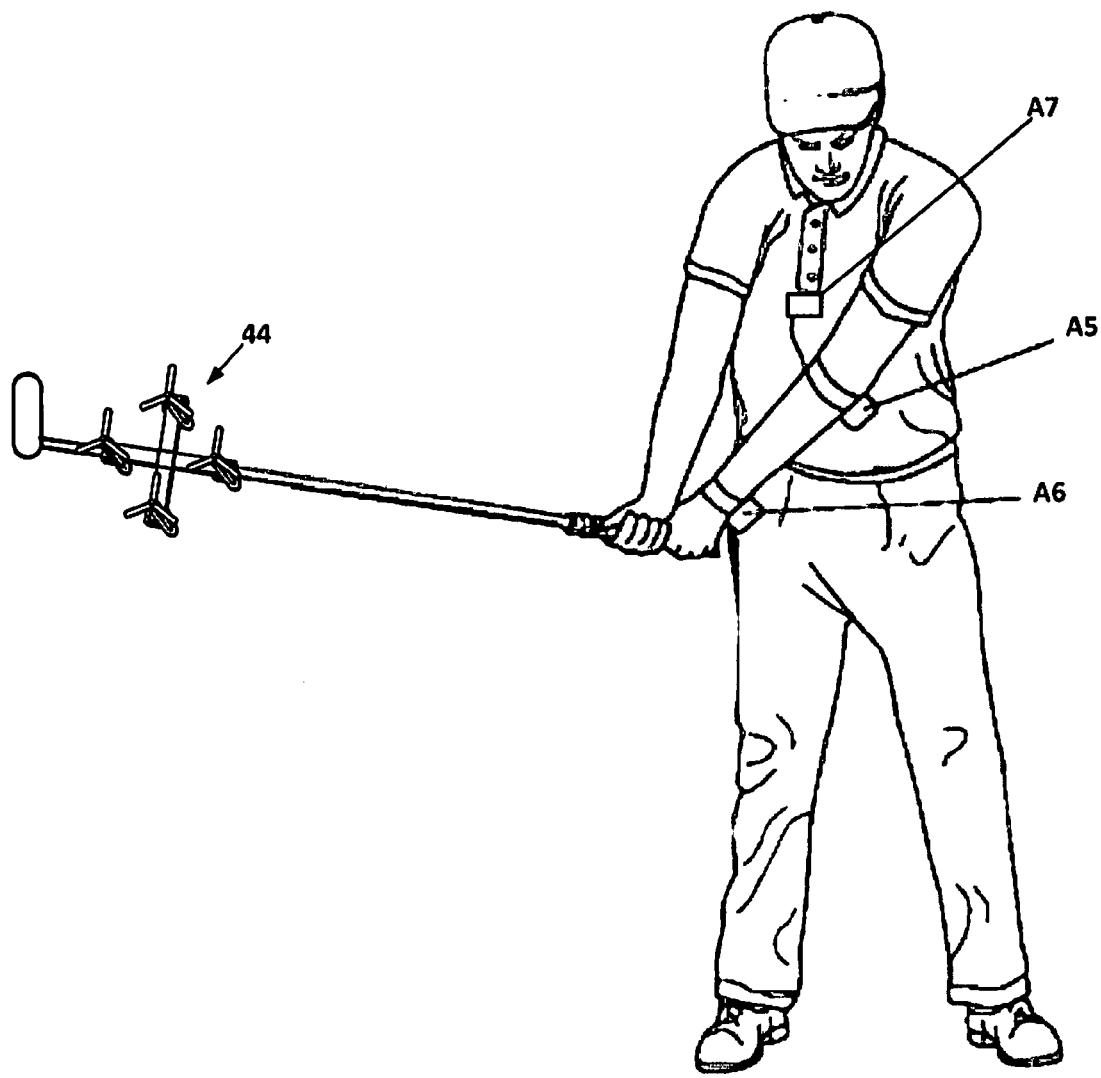
FIG. 20 depicts forearm position sensors and a xiphoid process positioning sensor according to a preferred embodiment of the invention.

Hinge angle errors may be determined using swing characteristic sensors that sense the angular relationship between the golf club 32 and the golfer's left forearm (for a right-handed golfer). As shown in FIG. 20, a pair of sensors, A5 and A6, are used to determine a vector generally coinciding with the ulna bone of the golfer's forearm. The sensor A5 is positioned adjacent the golfer's elbow and the sensor A6 is positioned adjacent the fifth metacarpal (pinky) side of the golfer's wrist. The sensors A5 and A6 may be accelerometers or other position sensors similar to sensors A1, A2, A3, and A4 described above. The sensors A5 and A6 may be attached to the golfer's forearm using elastic bands or Velcro straps.

As depicted in FIG. 18, the swing characteristic data as sensed by the swing characteristic sensors 351 is transferred to a processor 353. Signals from the sensors A1, A2, A3, A4, A5, and A6 may be transmitted via one or more wireless transmitters 309c, such as Bluetooth transmitters, or via a wiring harness connected to the computer processor 353. Alternatively, the processor 353 may be located on the carbon fiber frame of muscle trainer 44.

Based on the measured acceleration data from sensors A1, A2, A3, and A4, the processor 353 preferably calculates the orientation and direction of travel of the club shaft 34 and the club head 36 in three dimensions. Based on the measured acceleration data from sensors A5 and A6, the processor 353 calculates the orientation and direction of travel of the golfer's forearm in three dimensions. Calculation of the three-dimensional direction and velocity vectors based on the measured acceleration is accomplished using integration routines in software running on the processor 353. One example of a preferred analysis routine is described hereinafter.

Arc errors may be determined using swing characteristic sensors 351 that sense the angular relationship between the muscle trainer 44 and the golfer's xiphoid process (lower aspect of sternum). As shown in FIG. 20, sensor A7 is used to determine a vector generally coinciding with the golfer's xiphoid process. Sensor A7 may be an accelerometer or other position sensor similar to sensors A1, A2, A3, and A4 described above. Sensor A7 may be attached in the region of the golfer's xiphoid process using elastic bands or Velcro straps.

As depicted in FIG. 18, the swing characteristic data as sensed by the sensors 351 is transferred to a processor 353. Signals from the sensors A1, A2, A3, A4, and A7 may be transmitted via one or more wireless transmitters 309c, such as Bluetooth transmitters, or via a wiring harness connected to the computer processor 353. Alternatively, the processor 353 may be located on the carbon fiber frame of muscle trainer 44.

Based on the measured acceleration data from sensors A1, A2, A3, and A4, the processor 353 preferably calculates the orientation and direction of travel of the club head 36 in three dimensions. Based on the measured acceleration data from sensor A7, the processor 353 calculates the orientation and direction of travel of the golfer's xiphoid process in three dimensions. Calculation of the three-dimensional direction and velocity vectors based on the measured acceleration is accomplished using integration routines in software running on the processor 353. One example of a preferred analysis routine is described hereinafter.

It should be appreciated that there could be more than four accelerometer assemblies positioned on the muscle trainer 44, and that the accelerometer assemblies A1, A2, A3, and A4 and any additional accelerometer assemblies can be positioned in various different locations on the carbon fiber body. The depiction of the locations of these assemblies in FIGS. 4A and 4B is one example of four possible locations.

It should also be appreciated that there could be more than three accelerometer assemblies positioned on the golfer's body, and that the accelerometer assemblies A5, A6, and A7 can be positioned in various different locations on the golfer's arms and body. The depiction of the locations of these assemblies in FIG. 20 is one example of three possible locations.

As set forth previously, the swing characteristic sensors 351 may comprise accelerometer units A1, A2, A3, and A4 located on the muscle trainer 44 (See FIGS. 4A and 4B). In a preferred embodiment of the invention, acceleration signals from the units A1, A2, A3, and A4 are provided to a data acquisition board connected to the processor 353 where the acceleration signals are conditioned and digitized. As shown in the computational algorithm of FIG. 19, the initial positions of accelerometers A1 and A2 are determined at the beginning of a swing (step 400), such as by precise placement of the club head and shaft at predetermined reference positions (FIG. 5). The muscle trainer 44 attached to golf club 32 is then swung (FIG. 6) while sampling the accelerometer signals A1 and A2 at about one millisecond (or smaller) intervals (step 402). The sampled acceleration data is provided to a numerical ordinary differential equation (ODE) solver running on the processor 353. The ODE solver may be implemented as a commercially available software routine designed for acceleration-to-position conversions or as a more generally applicable Computer Algebraic System (CAS), such as Mathematica™. Preferably, the solver routine applies a Runge-Kutta method or other equivalent method suited for this purpose.

Figure 19:
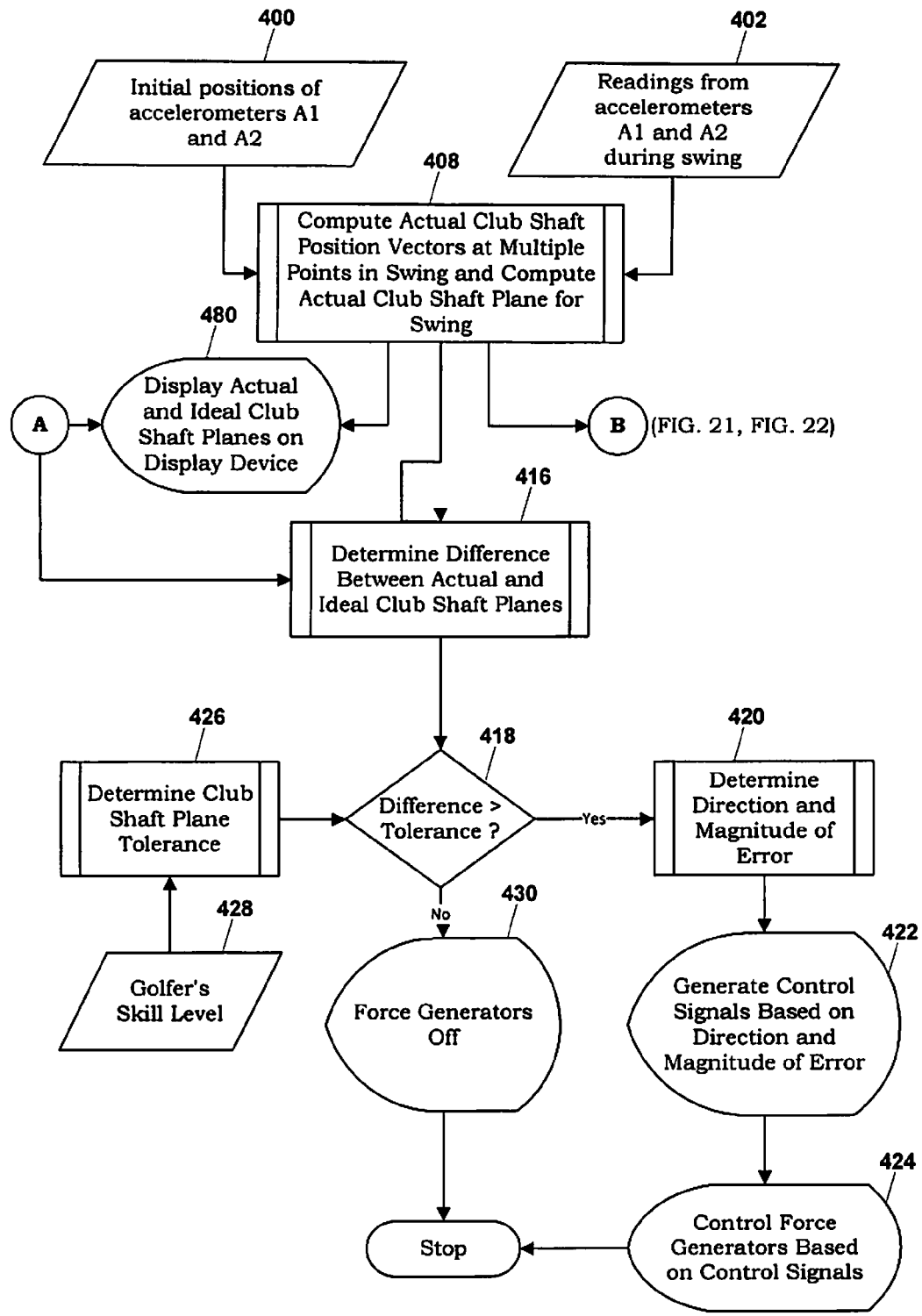
FIG. 19 depicts a flowchart of a method for comparing an actual club shaft plane to an ideal club shaft plane and generating club face plane training forces according to a preferred embodiment of the invention.
Figure 24:
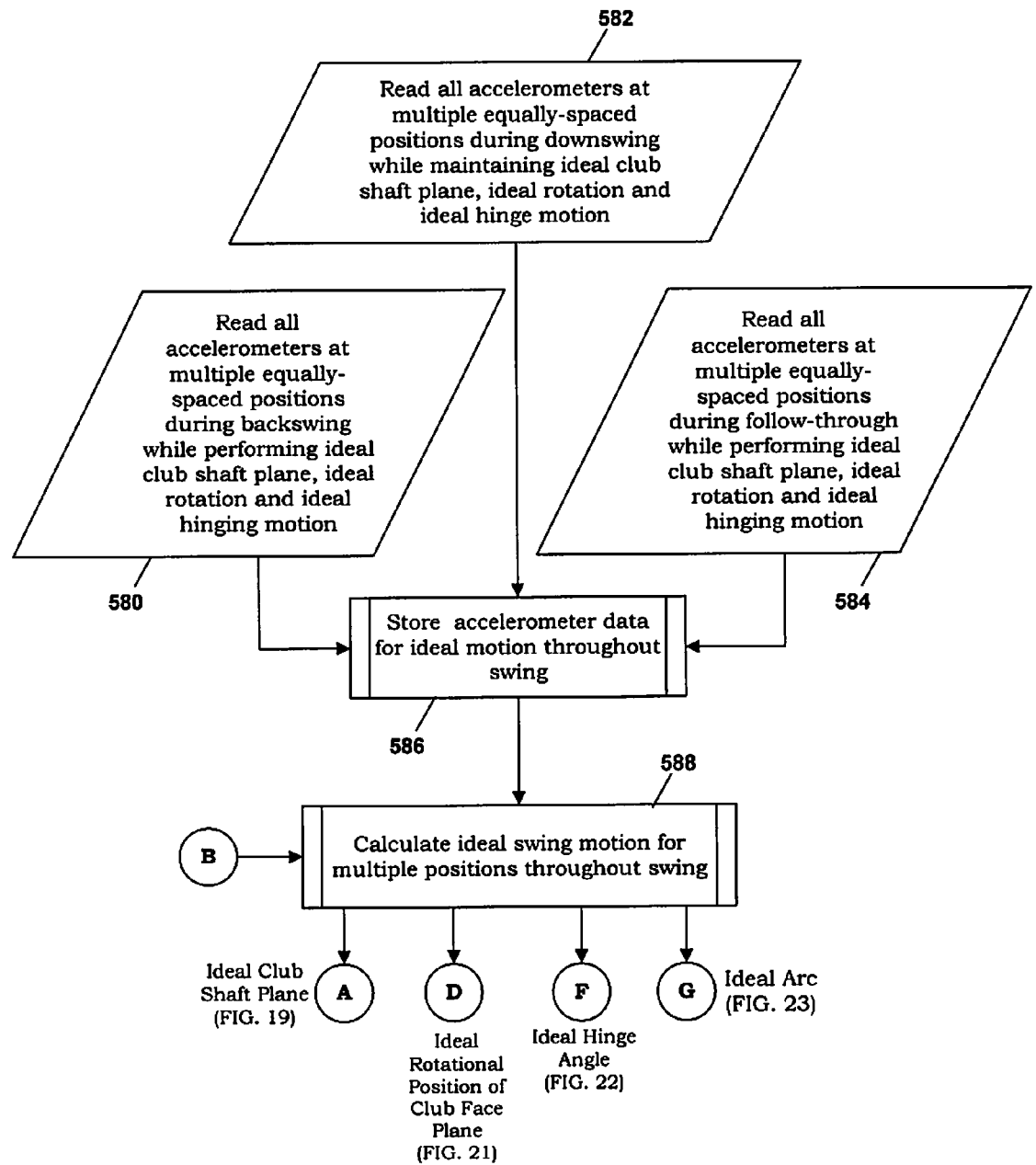
FIG. 24 depicts a flowchart of a method for determining an ideal swing motion during a swing of an implement with muscle trainer 44 attached according to a preferred embodiment of the invention.
Figure 25:
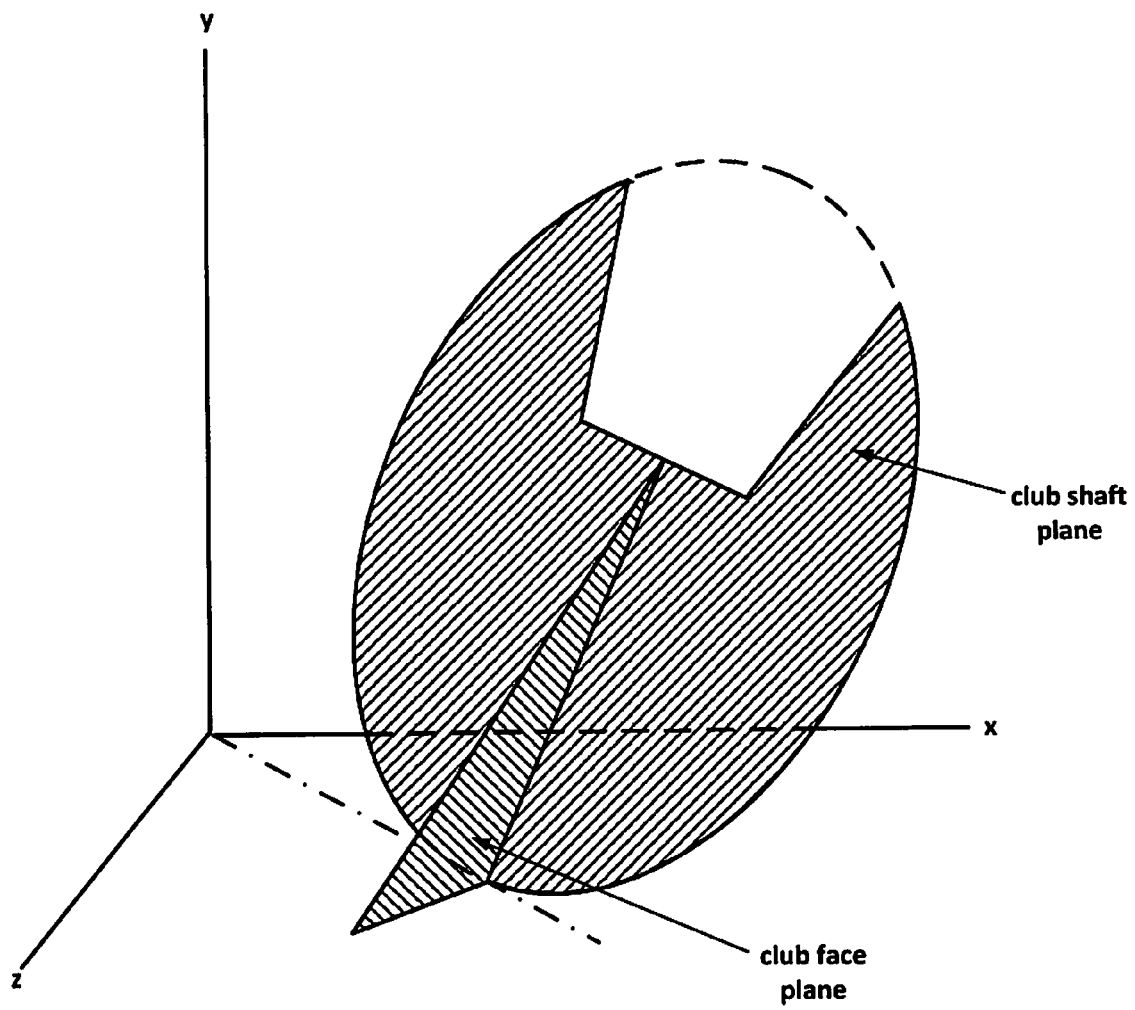
FIG. 25 depicts a graphical representation of a club shaft plane and a club face plane.

As shown in FIG. 24, the ideal club shaft plane data has already been entered into the processor 353 and enters FIG. 19 as input A at step 416 of FIG. 19.

Muscle Training Based on Swing Errors

Continuing with the computational algorithm of FIG. 19, the processor 353 then determines (step 418) if the difference between the actual club shaft plane and the ideal club shaft plane is greater than the predetermined club shaft plane error tolerance (step 426). If the difference is greater than the tolerance (step 420), then the error data is provided to the controller 355 (FIG. 18) that generates control signals (step 422) for controlling the magnitude and direction of force generators, such as the force generators 370a, 370b, 370c, and 370d depicted in FIGS. 4A and 4B. The error signals may be provided to the controller 355 via a wired interface with the processor 353 or via a wireless link provided by a wireless transmitter unit 309a. The control signals generated by the controller 355 are used to drive the force generators to create forces perpendicular to the club shaft plane (step 424) to urge the muscle trainer 44 (FIG. 4A) in the appropriate directions for proper conditioning of the club shaft plane muscles. At any given point during the swing, the direction of the training force is substantially identical to the direction of the error movement at that point and the strength of the training force is proportional to the magnitude of the error signal at that point.

If guidance feedback is used, the training force is substantially opposite to the direction of the error movement and the strength of the training force is proportional to the magnitude of the error signal at that point. If noisy feedback is used, the training force is in a random direction and the strength of the training force is random.

The club shaft plane dimension of control and the other three dimensions of control are represented in FIGS. 4A and 4B by the arrows 372a, 372b, 372c and 372d. The arrow 372a represents forces generated by the force generators 370a-d parallel to the club shaft plane, the arrow 372b represents forces generated by the force generator 370a-d in the hinge dimension, the arrow 372c represents rotational forces generated by force generator 370c and 370d about the club shaft 34, and the arrow 372d (FIG. 4B) represents forces generated by force generators 370a-d in the arc dimension. It should also be appreciated that there could be more than four force generators positioned on muscle trainer 44.

As shown in FIG. 18, the control signals may be provided to the force generators 370a, 370b, 370c, and 370d via a wired connection with the controller 355 or via a wireless link provided by a wireless transmitter unit 309b.

It will be appreciated that the force generators 370a, 370b, 370c, and 370d depicted in FIGS. 4A and 4B represent any means for generating force vectors in the directions indicated by the arrows 372a, 372b, 372c, and 372d. For example, the force generators 370a, 370b, 370c and 370d may be thrust generating devices as described herein, such as the motor and blade assemblies shown in FIGS. 4A and 4B, or other thrust generating devices such as jet engines, plasma thrusters, or magnetic thrusters. Thus, the invention is not limited to any particular type of device for generating forces in the directions indicated by the arrows 372a, 372b, 372c, and 372d.

It follows that at any given sampling interval during an actual swing, if the actual club shaft plane is located in front of the ideal club shaft plane and the difference is greater than the shaft plane tolerance, there is an in-front-of-the-plane error condition and the corresponding error signals are generated. If the actual club shaft plane is located behind the ideal club shaft plane and the difference is greater than the shaft plane tolerance, there is a behind-the-plane error condition and the corresponding error signals are generated. In either case, the error signals are provided to the controller 355 (FIG. 18) which generates the control signals to control the magnitude and direction of the force generators 370a-d on the muscle trainer 44. At any given point in the swing, the direction of the training force is substantially identical to the direction of the error movement at that point and the magnitude of the training force generated is proportional to the magnitude of the error signal at that point.

If guidance feedback is used, the training force is substantially opposite to the direction of the error movement and the strength of the training force is proportional to the magnitude of the error signal at that point. If noisy feedback is used, the training force is in a random direction and the strength of the training force is random.

In the error augmentation and guiding methods of providing feedback, if the difference between the actual club shaft plane and the ideal club shaft plane at any point in the swing is less than or equal to the shaft plane tolerance, then an in-the-ideal-shaft-plane condition is indicated at that point and the force generators are turned off at that point (step 430 of FIG. 19).

Preferably, determination of the shaft plane tolerance is based at least in part on inputting the level of skill of the golfer, i.e., beginner, intermediate or advanced. This allows players of any caliber to benefit from the use of the muscle trainer 44. In the preferred embodiment, the shaft plane tolerance is not set less than a value equal to twice the standard error as determined by the combined accuracy of the accelerometers and the numerical method. The standard error may be determined by repetitive calculation of the actual club shaft plane as the golf club 32 with the attached muscle trainer 44 is repetitively swung through a highly repeatable path using a mechanical swinging device, such as the commercially available Iron Byron.

As discussed previously, the club face plane is a true plane representing the position of the club face as if the club face had zero degrees of loft. The club face plane can be envisioned as an extension of a zero-degree club face that also passes through the shaft of the club. At the address position of the club, the club face plane is ideally a vertical plane that is essentially perpendicular to the club shaft plane.

To provide proper training of the movement of the club face plane in relationship to the club shaft plane, the full swing is divided by a horizontal line running through the nine o'clock toe up and three o'clock toe up positions (for the right-handed golfer). The half of the swing above the dividing horizontal line includes all segments of the backswing, downswing, and follow-through which occur above the horizontal line (Initial Hinging, Backswing Vertical, Finish Hinging, Backswing Completion, Downswing Initiation, Downswing Vertical, Downswing Middle, Re-Hinging, Follow-Through Vertical, Finish Re-Hinging, and Follow-Through Completion) and is referred to as the two-plane-merger zone of the swing. Motion errors within the two-plane-merger zone of the swing are represented by the probability diagram in FIG. 14. The other zone of the swing which exists below the dividing horizontal line includes all segments of the backswing, downswing, and follow-through which occur below the horizontal line (Address, Take-Away, Downswing Release, Impact, and Impact Follow-Through) and is referred to as the two plane perpendicular zone or impact zone of the swing. Motion errors within the two plane perpendicular zone of the swing are represented by the probability diagram in FIG. 15.

As depicted in FIG. 24, the professional assists in placing the golfer and the muscle trainer 350 in multiple equally spaced positions throughout the swing. These positions represent ideal rotational movement of the club face plane in relation to the club shaft plane. The signals from accelerometers A1, A2, A3, and A4 are read at each of these stationary positions. Each of these positions is stored in memory accessible to the processor 353 and is used in calculating the ideal club face plane movement during this portion of the swing (step 588). Specifically, the processor computes and stores the rotation angle between the club face plane and club shaft plane at each sample interval. This rotation angle value (referred to herein as $\theta$) will be ninety degrees at the address position and becomes close to zero at or near the backswing horizontal position. Enhanced accuracy of the ideal club face plane rotation determination can be obtained by increasing the number of stored ideal positions. This technique is described in more detail hereinafter.

Once the backswing has entered the two plane merger zone (at or near the backswing horizontal position), ideal rotational movement ceases and the club face plane should remain in a relatively constant relationship merged with the club shaft plane until the swing approaches the downswing horizontal position. As the downswing enters the impact zone (at or near the downswing horizontal position), the position of accelerometers A3 and A4 begin a period of rapid change in which they move away from the merged position in a direction above and below the club shaft plane to the impact (or two plane perpendicular) position and then back towards the club shaft plane with merger occurring again at or near the follow-through horizontal position. Once the follow-through has reentered the two plane merger zone (at or near the follow-through horizontal position), ideal rotational movement ceases and the club face plane should remain in a relatively constant relationship merged with the club shaft plane until the swing ends (follow-through completion position). Once again, enhanced accuracy of the ideal club face plane rotation determination can be obtained by increasing the number of stored ideal positions.

Figure 21:
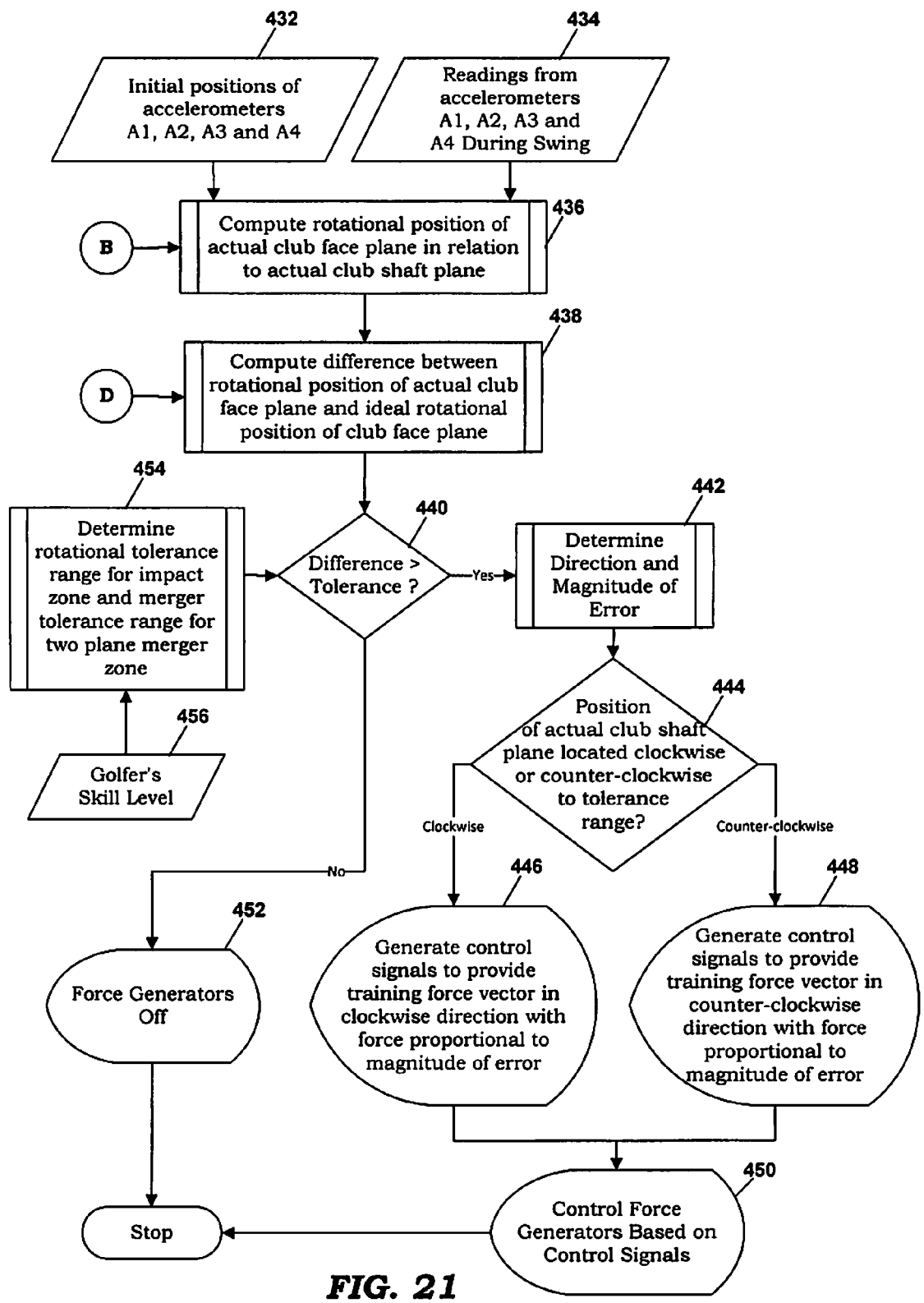
FIG. 21 depicts a flowchart of a method for comparing an actual club face plane rotation to an ideal club face plane rotation and generating club face plane rotation training forces according to a preferred embodiment of the invention.

As shown in FIG. 21, the initial positions of accelerometers A1, A2, A3, and A4 during an actual swing are determined at the beginning of the swing (step 432) with the muscle trainer in the address position. As the muscle trainer 350 is swung, the accelerometer signals from A1, A2. A3, and A4 are sampled at about one millisecond (or smaller) intervals (step 434). The sampled acceleration data is provided to the numerical ordinary differential equation (ODE) solver running on the processor 353, which calculates the club face plane position based on the positions of the accelerometers A1, A2, A3, and A4 measured at each sample interval (step 436). These four position points at each sample interval can be used to define the club face plane during the swing. The rotational position of the actual club face plane in relation to the actual club shaft plane can then be determined at any sampling interval (step 436).

With reference to FIG. 5, the preferred viewing perspective for an observer to visualize the rotational tolerance range and the merger tolerance range during an actual swing is to imagine a pair of eyes positioned near the end of the club shaft 34 looking toward the grip. This preferred viewing perspective for an observer will hereinafter be referred to as the "observer's viewing perspective." At the address position, the club face plane is located between the two eyes, with the distance from the club face plane to the right eye and the distance from the club face plane to the left eye being equal. As the swing begins, the eyes move with the club shaft 34 and rotate as needed to maintain their fixed angular relationship to the club face plane so that the club face plane is centered between the two eyes throughout the swing. In the backswing completion position, the pair of eyes will be upside down and looking approximately 180 degrees away from the target. In viewing a right-handed golfer through a complete swing, rotation of the actual club face plane outside of the tolerance range would be represented by either rotation of the observing eyes in an under-rotated (clockwise) direction or in an over-rotated (counter-clockwise) direction.

The pair of eyes could also be positioned adjacent the grip end of club shaft 34 looking toward the club head. This viewing perspective will, hereinafter, be referred to as the "golfer's viewing perspective." Using the golfer's viewing perspective for a right handed golfer, rotation of the actual club face plane outside of the tolerance range would be represented by either rotation of the observing eyes in an under-rotated (counter-clockwise) direction or in an over-rotated (clockwise) direction.

The observing eyes discussed above could be realized by placement of a miniature video camera with a viewing perspective axis (line of sight) coinciding with the club face plane. Combined with a computer generated representation of the ideal club face plane, this video perspective could be very useful to both the golfer and the teaching professional.

Using the observer's viewing perspective at any given sampling interval in the swing, if the actual club face plane is located outside of the rotational tolerance range and is on the clockwise side of the tolerance range (step 444 in FIG. 21), there is an under-rotation (or clockwise rotational) error condition and the corresponding error signals are generated (step 446). If the position of the actual club face plane is located outside of the rotational tolerance range and is on the counter-clockwise side of the tolerance range (step 444), there is an over-rotation (or counter-clockwise rotational) error condition and the corresponding error signals are generated (step 448). In either case, the error signals are provided to the controller 355 (FIG. 18) which generates the control signals to control the magnitude and direction of the force generators 370c and 379d on the muscle trainer 44. (step 450). At any given point in the swing, the direction of the training force is substantially identical to the direction of the error movement at that point and the magnitude of the training force generated is proportional to the magnitude of the error signal at that point.

If guidance feedback is used, the training force is substantially opposite to the direction of the error movement and the strength of the training force is proportional to the magnitude of the error signal at that point. If noisy feedback is used, the training force is in a random direction and the strength of the training force is random.

In the error augmentation and guiding methods of providing feedback, if the actual club face plane is located within the rotational tolerance range (step 440), then an ideal rotation condition is indicated at that point and the force generators 370c and 370d are turned off at that point (step 452).

Figure 22:
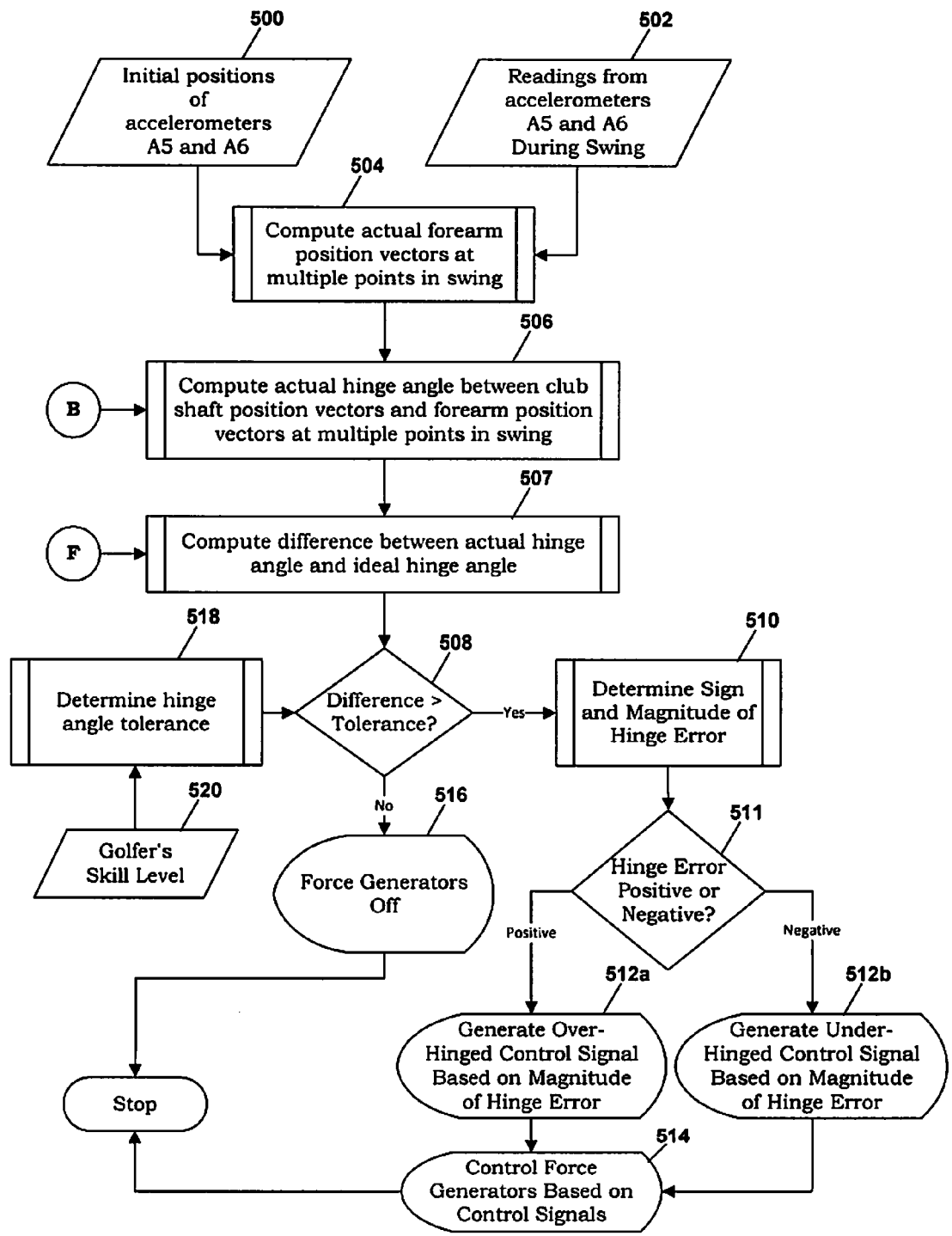
FIG. 22 depicts a flowchart of a method for comparing an actual hinge angle to an ideal hinge angle and generating hinge angle training forces according to a preferred embodiment of the invention.

As shown in FIG. 22, the initial positions of accelerometers A5 and A6 on the golfer's forearm are determined at the beginning of the swing (step 500) with the club head and shaft positioned at predetermined reference positions. As the golf club 32 with attached muscle trainer 44 is swung, the accelerometer signals from A5 and A6 are sampled at about one millisecond intervals (step 502). The sampled acceleration data is provided to the numerical ODE solver running on the processor 353, which calculates vectors representing the forearm position and orientation based on the signals from the accelerometers A5 and A6 measured at each sample interval (step 504). As shown in FIG. 12, the hinge angle is then determined to be the angle ($\phi$) between the club shaft position vectors and the forearm position vectors (step 506).

As shown in FIG. 24, the golf training professional assists in placing the golfer and golf club 32 with attached muscle trainer 44 in multiple equally-spaced ideal positions throughout the swing, including positions in the backswing, the down-swing and the follow-through. These positions represent ideal hinge movement. The signals from accelerometers A1, A2, A5, and A6 are read at each of these stationary positions (steps 580, 582 and 584). Data representing each of these positions are stored in memory accessible to the processor 353 (step 586) and are used in calculating the ideal hinge angle throughout the swing (step 588). In a preferred embodiment, the processor 353 computes and stores the ideal hinge angle ($\phi$) between the club shaft position vectors and the forearm position vectors. Enhanced accuracy of the ideal hinge angle determination can be obtained by increasing the number of stored ideal positions.

With reference again to FIG. 22, the actual hinge angle at any given sampling point during an actual swing is then compared to the ideal hinge angle at the corresponding point (step 507). If the difference between the actual and ideal hinge angles is greater than a predetermined hinge angle tolerance range (step 508), then an error condition exists. In this case, the direction (negative or positive) and magnitude of the error are determined (step 510). If the hinge angle error is positive ($+\phi_E$) (step 511), then an over-hinged control signal is generated based on the magnitude of the over-hinged error (step 512a). If the hinge angle error is negative ($-\phi_E$) (step 511), then an under-hinged control signal is generated based on the magnitude of the under-hinged error (step 512b). In either case, the error signals are provided to the controller 355 (FIG.

18) which generates the control signals to control the magnitude and direction of the force generators 370*a-d* on the muscle trainer 44 (step 514).

At any given point in the swing, the direction of the training force is preferably substantially identical to the direction of the error movement at that point and the magnitude of the training force generated is proportional to the magnitude of the error signal at that point.

If guidance feedback is used, the training force is substantially opposite to the direction of the error movement and the strength of the training force is proportional to the magnitude of the error signal at that point. If noisy feedback is used, the training force is in a random direction and the strength of the training force is random.

The hinge tolerance range is determined based on data representing the level of skill of the golfer who is using the training device (steps 518 and 520). This tolerance range may be measured in degrees and is preferably set at a smaller angle for professionals than for amateurs.

In the error augmentation and guiding methods of providing feedback, if the actual hinge angle is within the hinge angle tolerance range (step 508), then an ideally-hinged condition is indicated at that point and the force generators 370*a-d* are turned off at that point (step 516).

Figure 23:
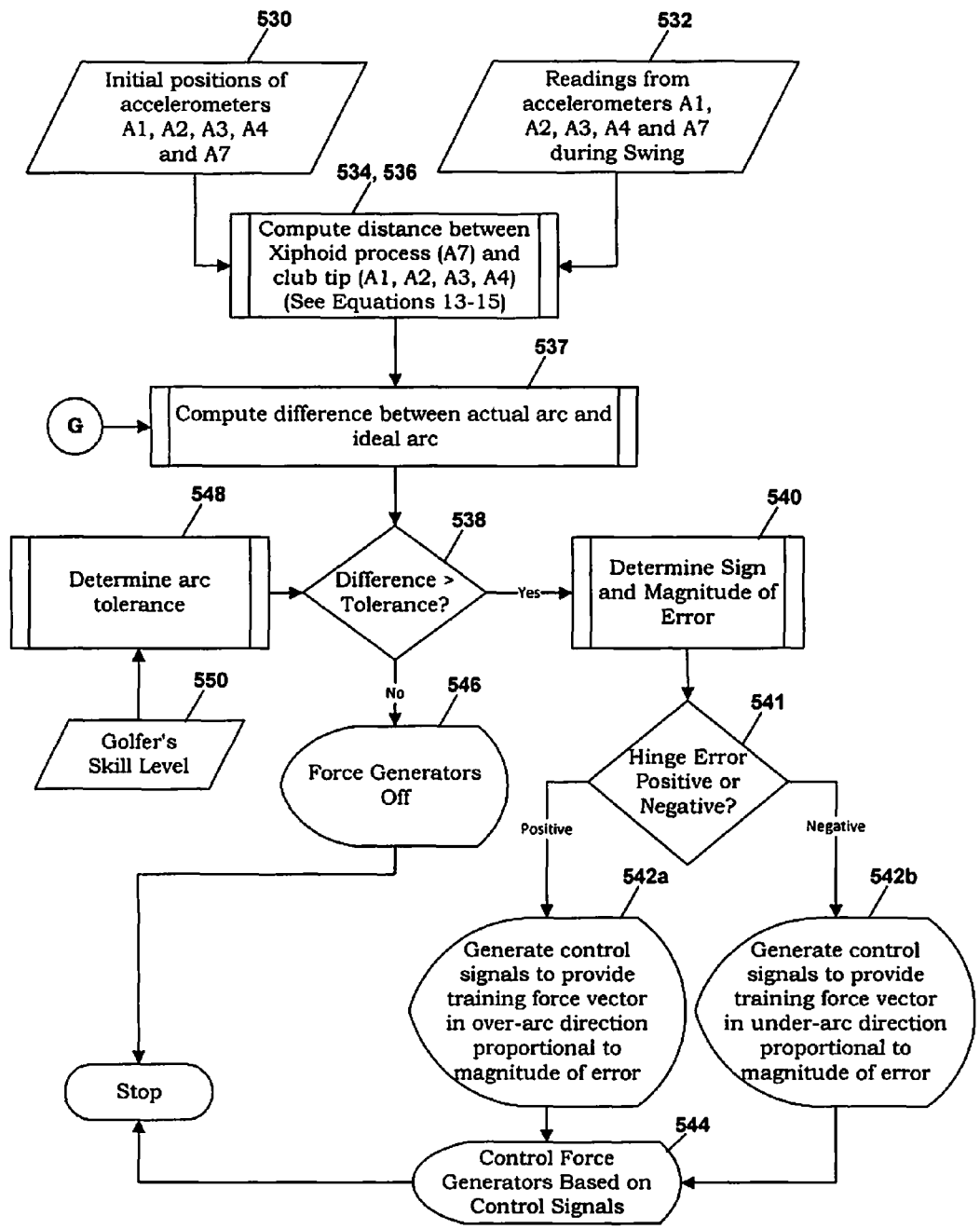
FIG. 23 depicts a flowchart of a method for comparing an actual arc to an ideal arc and generating arc training forces according to a preferred embodiment of the invention.

As shown in FIG. 23, the initial positions of accelerometers A3, A4, and A7 located adjacent the golfer's xiphoid process are determined at the beginning of the swing (step 530) with the club head and shaft positioned at predetermined reference positions. As the golf club 32 with attached muscle trainer 44 is swung, the accelerometer signals from A3, A4, and A7 are sampled at about one millisecond intervals (step 532). The sampled acceleration data is provided to the numerical ODE solver running on the processor 353, which calculates vectors representing the xiphoid process position and orientation based on the signals from the accelerometer A7 measured at each sample interval (step 534). As described in more detail hereinafter, the arc distance is then determined to be the distance between A7 and the distal end of the golf club 32 (step 536).

As shown in FIG. 24, the golf training professional assists in placing the golfer and golf club 32 with attached muscle trainer 44 in multiple equally spaced ideal positions throughout the swing, including positions in the backswing, the down-swing and the follow-through. These positions represent ideal arc movement. The signals from accelerometers A3, A4, and A7 are read at each of these stationary positions (steps 580, 582 and 584). Data representing each of these positions are stored in memory accessible to the processor 353 (step 586) and are used in calculating the ideal arc (G) throughout the swing (step 588). In a preferred embodiment, the processor 353 computes and stores the ideal arc between the club tip position vectors and the xiphoid process position vectors. Enhanced accuracy of the ideal arc determination can be obtained by increasing the number of stored ideal positions. The club tip position is also referred to herein as the "second position," and the xiphoid process position is also referred to herein as the "seventh position."

With reference again to FIG. 23, the actual arc at any given sampling point during an actual swing is then compared to the ideal arc at the corresponding point (step 537). If the difference between the actual and ideal arc is greater than a predetermined arc tolerance range (step 548), then an error condition exists (step 538). In this case, the direction (negative or positive) and magnitude of the error are determined (step 540). If the arc error is positive (step 541), then an over-arc control signal is generated based on the magnitude of the over-arc error (step 542*a*). If the arc error is negative (step 541), then an under-arc control signal is generated based on the magnitude of the under-arc error (step 542*b*). In either case, the error signals are provided to the controller 355 (FIG. 18) which generates the control signals to control the magnitude and direction of the force generators 370*a-d* on the muscle trainer 44 (step 544).

At any given point in the swing, the direction of the training force is preferably substantially identical to the direction of the error movement at that point and the magnitude of the training force generated is proportional to the magnitude of the error signal at that point.

If guidance feedback is used, the training force is substantially opposite to the direction of the error movement and the strength of the training force is proportional to the magnitude of the error signal at that point. If noisy feedback is used, the training force is in a random direction and the strength of the training force is random.

The arc tolerance range is determined based on data representing the level of skill of the golfer who is using the training device (steps 548 and 550). This tolerance range may be measured in centimeters and is preferably set at a smaller distance for professionals than for amateurs.

In the error augmentation and guiding methods of providing feedback, if the actual arc is within the arc tolerance range (step 538), then an ideal arc condition is indicated at that point and the force generators 370*a-d* are turned off at that point (step 546).

As shown in FIG. 24, it will be appreciated that sensor data for determining the ideal club shaft plane positions, ideal rotation positions, ideal hinge motion positions, and ideal arc positions may be collected simultaneously as the professional assists in placing the golfer in multiple positions in the back-swing (step 580), downswing (step 582) and follow-through (step 584) portions of the "ideal" swing. In a preferred embodiment, this position data is stored in memory or on a storage device (step 586) and the ideal swing motion, including ideal club shaft plane, ideal rotation motion, ideal hinge motion, and ideal arc motion may be calculated (step 588) by sub-modules of a comprehensive software program. Thus, the invention is not limited to any particular sequence or timing of the collection of the ideal swing motion data.

Calculation of Swing Error Vectors—Sensor Plane Parallel with Club Face Plane

As discussed above, the accelerometers A1, A2, A3 and A4 generate signals indicative of position and velocity values at four positions corresponding to the locations of the four force generators 370*a*, 370*b*, 370*c*, and 370*d*. Using these accelerometer signals, positions of the club-shaft (CS) plane and the club-face (CF) plane may be mathematically defined so that the angle between these two planes may be determined at time increments during a swing.

Figure 26:
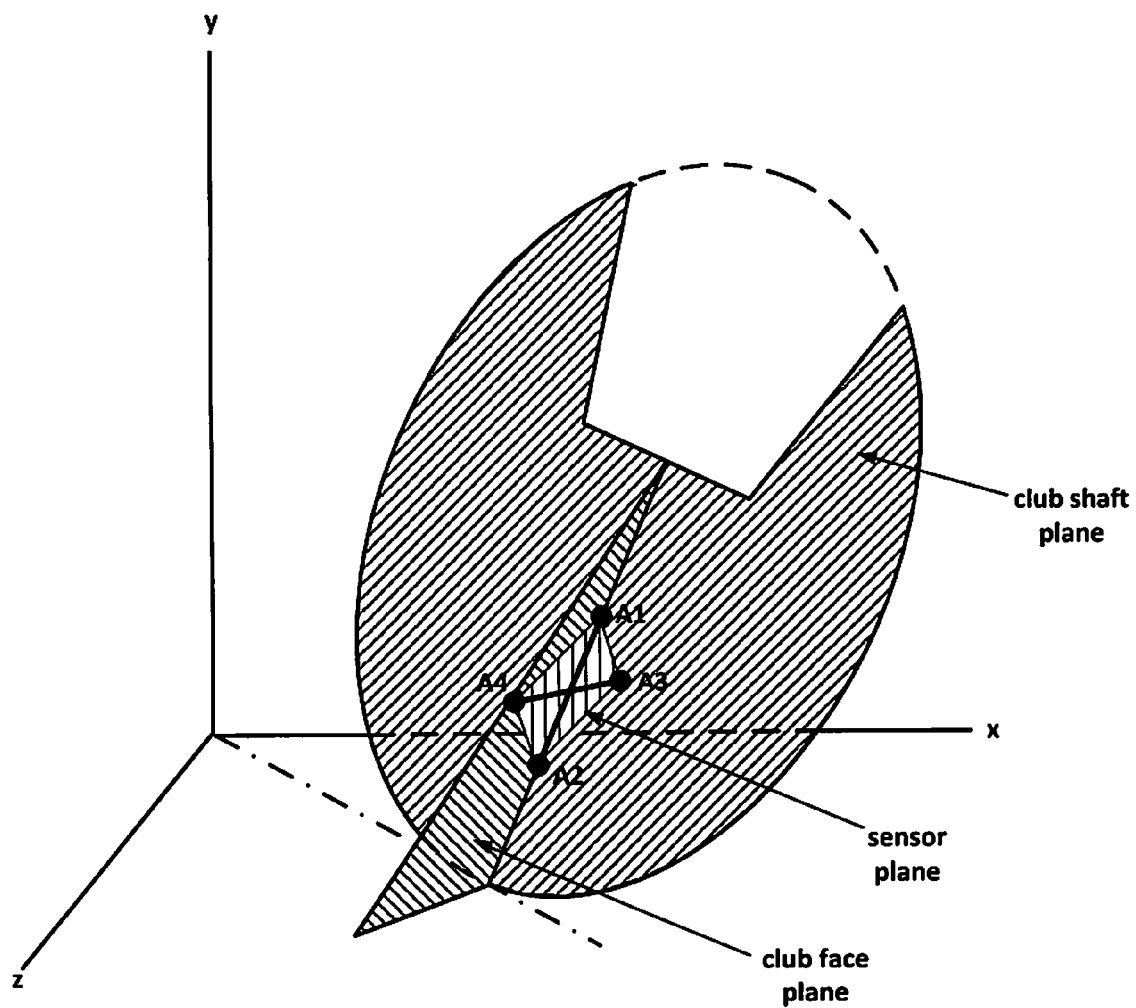
FIG. 26 depicts motion sensors disposed in a sensor plane coinciding with a club face plane.

The angle between the club-shaft plane and the club-face plane varies during the swing due to motion of a golfer's wrist and arms during a swing that causes a twisting movement of the club face. In a preferred embodiment depicted in FIG. 26, in order to capture the relative motion of the club-shaft plane and club-face plane during the swing, all four accelerometers A1, A2, A3 and A4 are disposed in a sensor plane that coincides with the club-face plane. This sensor plane can be thought of as extending through the player's body when the club is held in the address position (FIG. 5). As shown in FIG. 26, when the club is held in the address position, accelerometer A3 extends toward the player's body on a line perpendicular to the shaft, accelerometer A4 extends away from the player's body on a line perpendicular to the shaft, and accelerometers A1 and A2 are aligned with the club shaft.

The velocities measured by A1 and A2 can be represented as vectors that point approximately parallel to the club-shaft plane throughout the swing. These three-dimensional velocity vectors are denoted as $\vec{v}_1$ and $\vec{v}_2$, respectively. Each has x-y-z components that form a triplet as set forth in equation (1).

$$\vec{v}_1 = \langle v_{1x}, v_{1y}, v_{1z} \rangle \quad \vec{v}_2 = \langle v_{2x}, v_{2y}, v_{2z} \rangle \tag{1}$$

The nonweighted average of these two vectors is determined as:

$$\vec{v}_{avg,CS} = \frac{\vec{v}_1 + \vec{v}_2}{2} = \left\langle \frac{v_{1x}+v_{2x}}{2}, \frac{v_{1y}+v_{2y}}{2}, \frac{v_{1z}+v_{2z}}{2} \right\rangle. \tag{2}$$

If a particular application required one of the velocity vectors to be weighted more than the other in the calculations, a weighted average can be defined using two blend parameters, $\alpha_1$ and $\alpha_2$:

$$\vec{v}_{avg,CS} = \alpha_1 \vec{v}_1 + \alpha_2 \vec{v}_2 = \langle \alpha_1 v_{1x} + \alpha_2 v_{2x}, \alpha_1 v_{1y} + \alpha_2 v_{2y}, \alpha_1 v_{1z} + \alpha_2 v_{2z} \rangle$$

where the blend parameters must satisfy:

$$\alpha_1 + \alpha_2 = 1$$

Experimentation may reveal the best selection of blend parameters for defining the club shaft plane and club face plane in situations where velocity weighting is needed.

Since the average velocity lies on the club shaft plane, the club shaft plane can be defined as the plane containing accelerometers A1 and A2 and the average velocity vector $\vec{v}_{avg,CS}$. The equation of this plane is found by first taking the cross-product of the velocity vector $\vec{v}_{avg}$ and the displacement vector $\vec{r}_{cs}$ that joins accelerometers A1 and A2. This cross-product yields $\vec{N}_{CS}$ which is a vector perpendicular to the club-shaft plane. These vectors are expressed in equations (3) and (4).

$$\vec{r}_{CS} = \langle x_{A2}-x_{A1}, y_{A2}-y_{A1}, z_{A2}-z_{A1} \rangle \tag{3}$$

$$\vec{N}_{CS} = \vec{r}_{CS} \times \vec{v}_{avg,CS} \tag{4}$$

Figure 27:
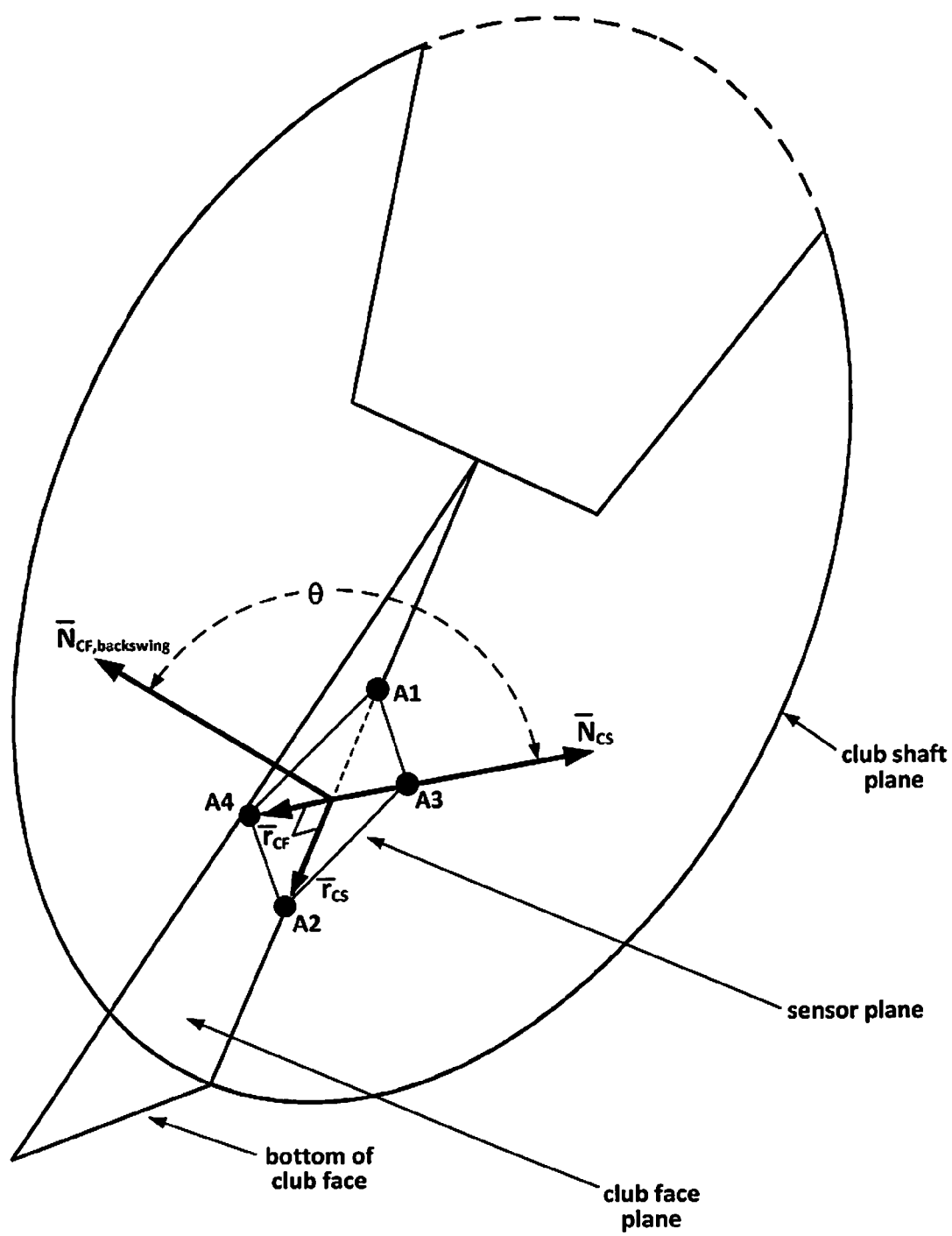
FIG. 27 depicts an angular orientation between a club face plane normal vector and a club shaft plane normal vector during a backswing motion.
Figure 28:
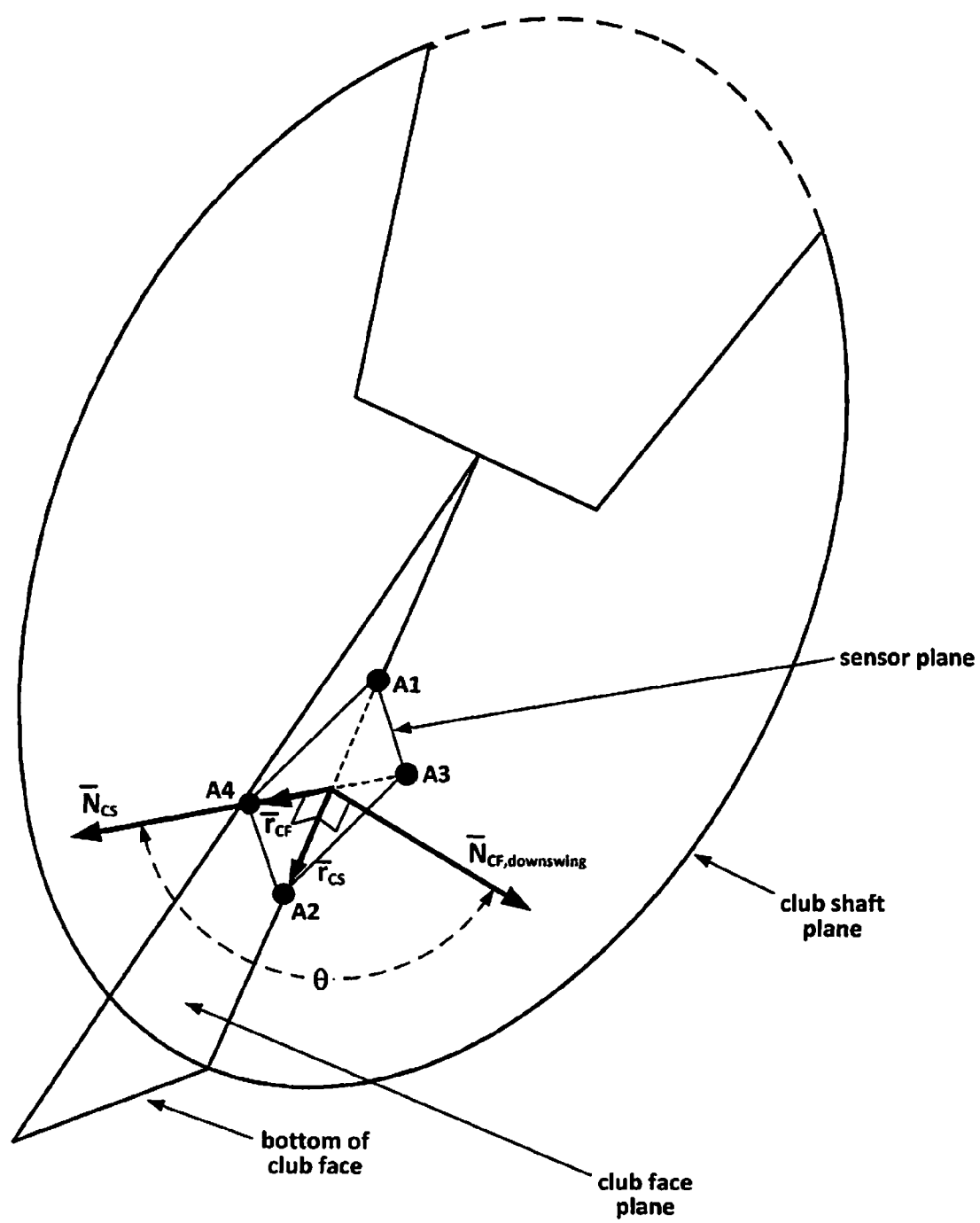
FIG. 28 depicts an angular orientation between a club face plane normal vector and a club shaft plane normal vector during a downswing motion.

As shown in FIG. 27, $\vec{N}_{CS}$ generally points down and toward the golfer in the address position. As shown in FIG. 28, $\vec{N}_{CS}$ points upward and away from the golfer at the impact position. This change of direction occurs because the velocity vector $\vec{v}_{avg,CS}$ changes direction by approximately 180 degrees between the backswing and downswing.

Similar calculations are done for velocity vectors in the club face (CF) plane. As shown in FIGS. 27 and 28, these include the vectors $\vec{r}_{CS}$ and $\vec{r}_{CF}$. The vector $\vec{r}_{CS}$ is defined by equation (3) above and is disposed between accelerometers A1 and A2 on the club shaft. The vector $\vec{r}_{CF}$ is disposed between accelerometers A3 and A4 and is approximately parallel to the club-face plane as defined by:

$$\vec{r}_{CF} = \langle x_{A4}-x_{A3}, y_{A4}-y_{A3}, z_{A4}-z_{A3} \rangle. \tag{5}$$

It should be noted that the placement of accelerometers A1, A2, A3 and A4 require the vectors $\vec{r}_{CS}$ and $\vec{r}_{CF}$ to be perpendicular to each other and that the configuration be rigid.

A cross-product between $\vec{r}_{CS}$ and $\vec{r}_{CF}$ yields a vector perpendicular to the club face plane. In order to determine the angle between the club face plane and club shaft plane to determine whether or not they are "merged," the normal to the club face plane should point in one direction during the backswing and in the opposite direction during the downswing. These two perpendicular vectors are depicted in FIGS. 27 and 28, respectively, and are defined as:

$$\vec{N}_{CF,backswing} = \vec{r}_{CS} \times \vec{r}_{CF} \tag{6a}$$

and $$\vec{N}_{CF,downswing} = \vec{r}_{CF} \times \vec{r}_{CS} \tag{6b}$$

FIG. 28 depicts the ideal positioning of the club shaft plane with respect to the club face plane at the instant the ball is struck by the club face. At that instant, $\vec{N}_{CF,downswing}$ ideally coincides with the club shaft plane, which means $\vec{N}_{CF,downswing}$ perpendicular to $\vec{N}_{CS}$. This condition can be checked by calculating the angle $\theta$ between $\vec{N}_{CF,downswing}$ and $\vec{N}_{CS}$ which is the angle the club shaft plane and the club face plane. During the downswing as shown in FIG. 28, the angle $\theta$ is calculated as:

$$\theta = \cos^{-1}\left( \frac{\vec{N}_{CF,downswing} \cdot \vec{N}_{CS}}{|\vec{N}_{CF,downswing}||\vec{N}_{CS}|} \right). \tag{7a}$$

During the backswing as shown in FIG. 27, the angle $\theta$ is calculated as:

$$\theta = \cos^{-1}\left( \frac{\vec{N}_{CF,backswing} \cdot \vec{N}_{CS}}{|\vec{N}_{CF,backswing}||\vec{N}_{CS}|} \right). \tag{7b}$$

Figure 29:
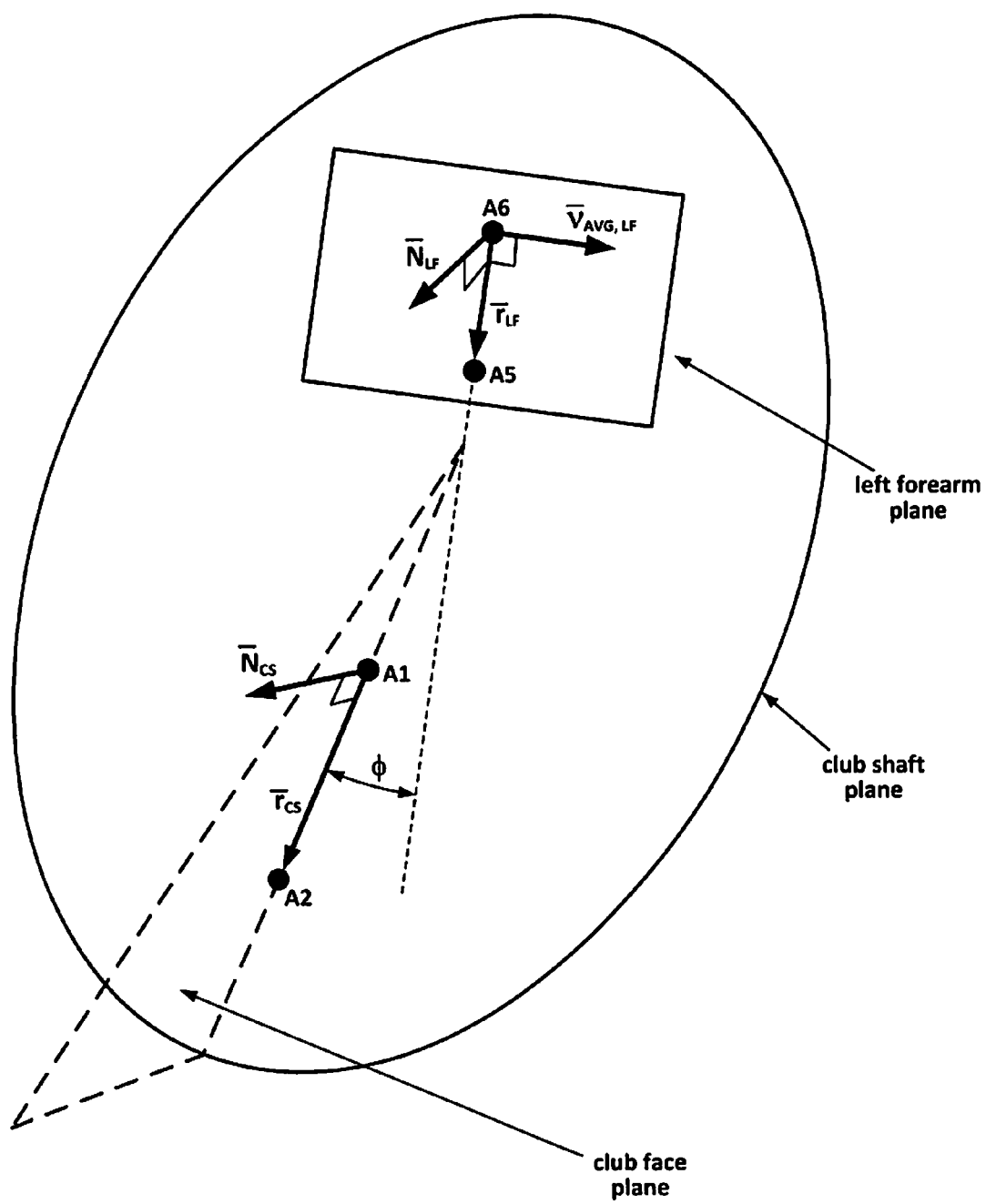
FIG. 29 depicts a graphical representation of a club shaft plane, a club face plane, and a left forearm plane.

The accelerometers A5 and A6 placed on the left forearm yield similar data and may be used in the same way to determine a "Left Forearm" (LF) plane. The angle between the LF plane and any of the other planes may be determined by an equation similar to (7a). As shown in FIG. 29, a displacement vector $\vec{r}$ along the left forearm may be defined as:

$$\vec{r}_{LF} = \langle x_{A6}-x_{A5}, y_{A6}-y_{A5}, z_{A6}-z_{A5} \rangle \tag{8}$$

an average velocity of the left forearm $\vec{v}_{avg,LF}$ may be defined as:

$$\vec{v}_{avg,LF} = \frac{\vec{v}_6 + \vec{v}_5}{2} = \left\langle \frac{v_{6x}+v_{5x}}{2}, \frac{v_{6y}+v_{5y}}{2}, \frac{v_{6z}+v_{5z}}{2} \right\rangle. \tag{9}$$

and a vector $\vec{N}_{LF}$, which is normal to the LF plane, may be defined as:

$$\vec{N}_{LF} = \vec{r}_{LF} \times \vec{v}_{avg,LF}. \tag{10}$$

The angle between the LF plane and the club shaft plane then may be determined as:

$$\theta_{LFandCS} = \cos^{-1}\left( \frac{\vec{N}_{LF} \cdot \vec{N}_{CS}}{|\vec{N}_{LF}||\vec{N}_{CS}|} \right). \tag{11}$$

As shown in FIG. 29, the hinge angle θ between the left forearm (vector $\vec{r}_{LF}$ in equation (8)) and the club shaft (vector $\vec{r}_{CS}$ in equation (3)) may also be calculated using the inverse cosine of a dot product:

$$\phi = \cos^{-1}\left(\frac{\vec{r}_{LF} \cdot \vec{r}_{CS}}{|\vec{r}_{LF}||\vec{r}_{CS}|}\right) \quad (12)$$

Figure 30:
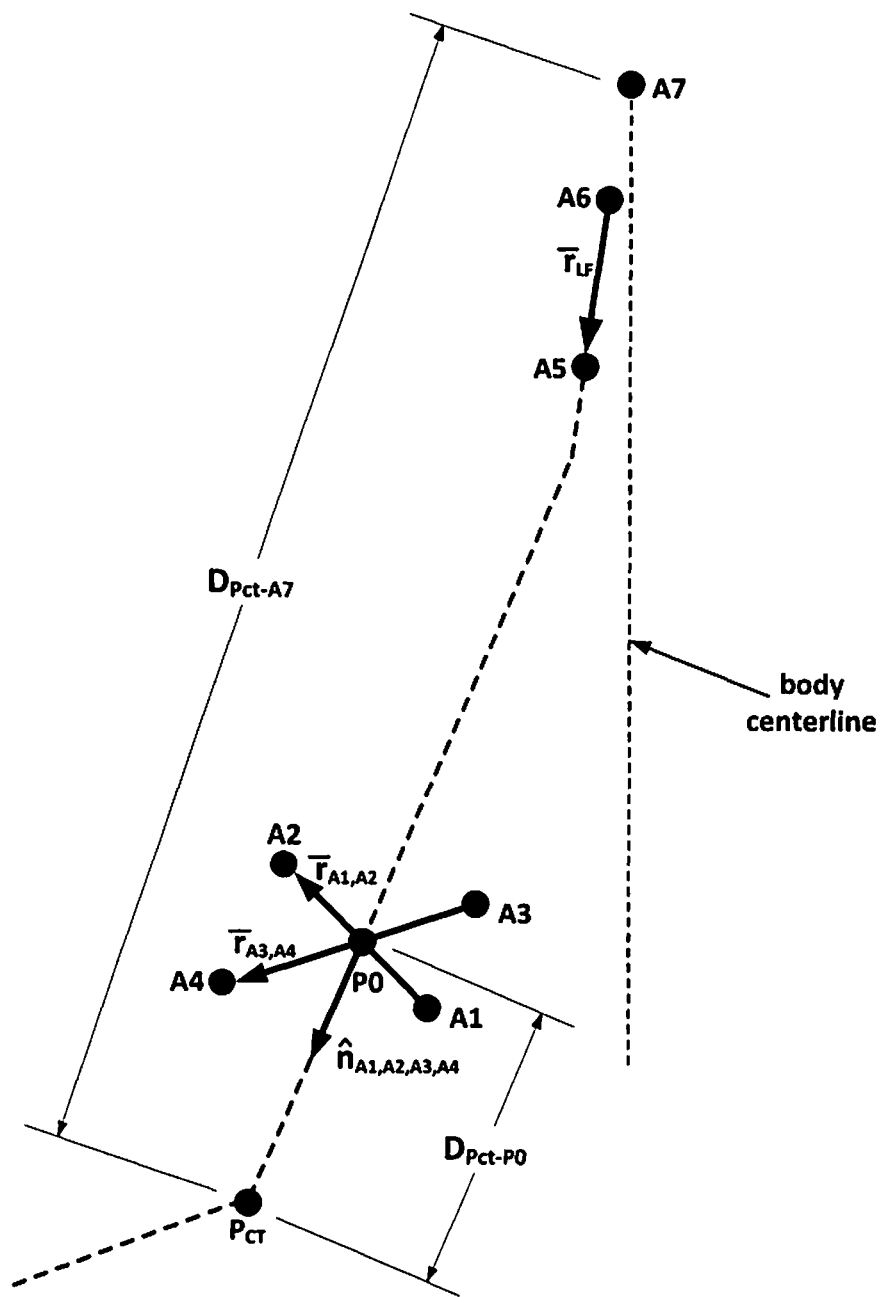
FIG. 30 depicts motion sensors disposed in a sensor plane that is perpendicular to a club shaft, and sensors disposed on a forearm and on the body centerline of a person swinging the club.

Another quantity of interest in evaluating golf-swing form is the arc distance between a point at which an accelerometer A7 is placed on the golfer's body-centerline and a point $P_{CT}$ disposed at or near the club tip. As shown in FIG. 30, this distance is denoted as $D_{P_{CT}\text{-}A7}$. For an "arc distance testing" evaluation, the four accelerometers A1, A2, A3 and A4 are placed in a plane that is perpendicular to the club shaft as in FIG. 4B. As shown in FIG. 30, this may achieved by rotating the accelerometers shown in FIGS. 27 and 28 by 90 degrees about an axis extending between the accelerometers A3 and A4 so that accelerometer A1 extends in the direction of the target (to the left of the club from the golfer's perspective). The point P0 in FIG. 30 represents a point at which the structure holding the accelerometers is attached to the club shaft. The club tip can either be defined as the bottom of the club shaft or as the tip of the club head. In the configuration of FIG. 30, the bottom of the club shaft has been chosen as the club tip. Based on the placement of the accelerometers, the distance between the point $P_1$ at the club tip and the point P0 is expressed as $D_{P_{CT}\text{-}P_0}$. The vectors $\vec{r}_{A1,A2}$ and $\vec{r}_{A3,A4}$ may be obtained based on equations (3) and (5) and the x-y-z locations of accelerometers A1, A2, A3 and A4. It should be noted that the vector $\vec{r}_{A1,A2}$ now points in a direction perpendicular to the club shaft and is rotated 90 degrees from the vector $\vec{r}_{A3,A4}$. The unit vector $\hat{n}_{A1,A2,A3,A4}$ which coincides with the club-shaft is determined as the cross product between $\vec{r}_{A1,A2}$ and $\vec{r}_{A3,A4}$ divided by its length:

$$\hat{n}_{A1,A2,A3,A4} = \frac{\vec{r}_{A3,A4} \times \vec{r}_{A1,A2}}{\|\vec{r}_{A3,A4} \times \vec{r}_{A1,A2}\|} \quad (13)$$

A right-hand-side notation has been used for vector cross products in this description to ensure that the normal to the accelerometer plane points in the direction of the club tip.

The location of the point $P_{CT}$ can now be determined by moving a known distance $D_{P_{CT}\text{-}P_0}$ from the point P0 in the direction of the unit vector $\hat{n}_{A1,A2,A3,A4}$ along the club-shaft:

$$\vec{x}_{PCT} = \vec{x}_{P0} + \hat{n}_{A1,A2,A3,A4} D_{P_{CT}\text{-}P0} \quad (14)$$

where $\vec{x} = \langle x,y,z \rangle$. Knowing the coordinates of the club-tip $\vec{x}_{P_{CT}}$ and those of the body-centerline accelerometer $\vec{x}_{A7}$, one can determine the distance between those points as the norm of the difference of the coordinates:

$$D_{P_{CT}\text{-}A7} = \|\vec{x}_{PCT} - \vec{x}_{A7}\| \quad (15)$$

This distance is also referred to herein as the arc distance.

In most cases, when the club is swung down to contact the ball, as when driving the ball down the fairway, it is desirable that the club face plane velocity vector be parallel to the ground at the instant the club contacts the ball. In some embodiments of the invention, the angles of the velocity vectors of accelerometers A3 and A4 are monitored to insure that they are perpendicular to local gravity which is assumed to be in the vertical (z-axis) direction. If the z-axis is defined to be parallel to the earth's local gravity, the relationships $$\vec{v}_3 \cdot \hat{z} = 0 \text{ and } \vec{v} \cdot \hat{z} = 0$$

should be satisfied when the club face impacts the ball, where $\hat{z}$ denotes a unit vector perpendicular to the ground. In some embodiments, the processor 353 monitors these conditions and generates an alert for the coach and/or golfer when these conditions are violated during a swing.

If the transition from backswing to downswing is made incorrectly, the club head may drop or rise before the downswing starts. Such a "loop" in the top of the swing would result in the angle between the club shaft plane and club face plane to go to about 90 degrees. This condition may also be monitored in some embodiments and an alert generated for the coach or golfer.

Figure 31:
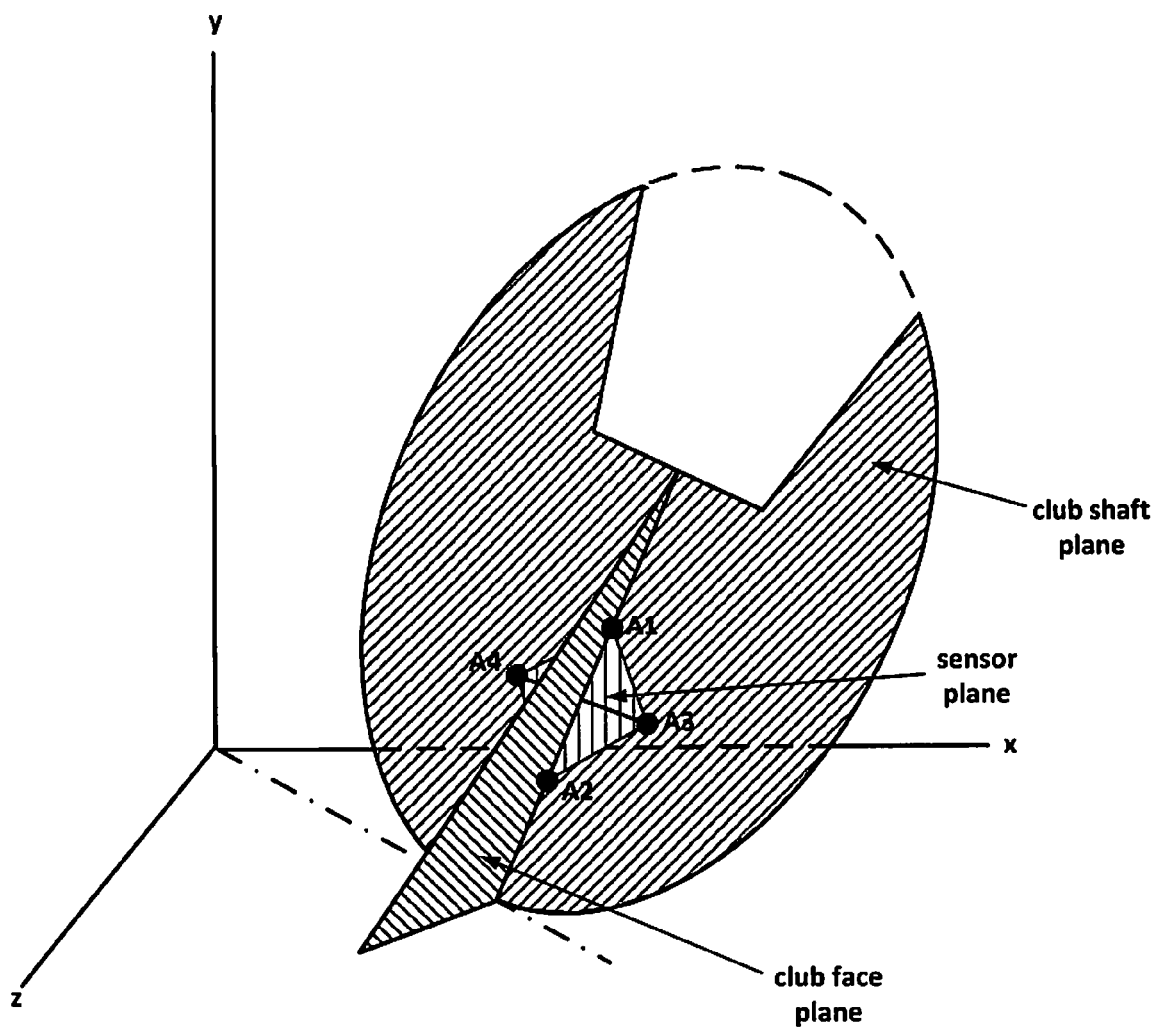
FIG. 31 depicts motion sensors disposed in a sensor plane coinciding with a club shaft plane.

Calculation of Swing Error Vectors—Sensor Plane Perpendicular to Club Face Plane In the embodiment depicted in FIGS. 4A and 31, the sensor plane defined by the locations of accelerometers A1, A2, A3 and A4 substantially coincides with the club shaft plane when the club head contacts the ball. As in the embodiment of FIG. 26, accelerometers A1 and A2 are aligned with the club-shaft. Thus, the vectors $\vec{r}_{CS}$ and $\vec{N}_{CS}$ are defined as discussed above. However, in this embodiment, the accelerometers A3 and A4 are disposed on a line perpendicular to the club-shaft which approximately coincides with the club shaft plane. As depicted in FIG. 31, the location of accelerometer A3 is toward the target (to the left of the club from the golfer's perspective), and accelerometer A4 is located to the right of the club from the golfer's perspective. The vector $\vec{r}_{A3,A4}$ is computed as described above (equation 5).

It should be noted that the placement of accelerometers A1, A2, A3, and A4 still requires the vectors $\vec{r}_{CS}$ and $\vec{r}_{A3,A4}$ to be perpendicular. In this embodiment, however, the vector $\vec{r}_{A3,A4}$ is perpendicular to the club face plane instead of being in the club face plane. In fact, the vector $\vec{r}_{A3,A4}$ can serve as the normal to the club face plane with the appropriate correction for the 180 degree change in direction during the backswing and the downswing. Thus, the vectors $\vec{N}_{CF,backswing}$ and $\vec{N}_{CF,downswing}$ may be defined as:

$$\vec{N}_{CF,backswing} = \vec{r}_{A3,A4} \quad (16a)$$

$$\vec{N}_{CF,downswing} = -\vec{r}_{A3,A4}. \quad (16b)$$

The remaining calculations are the same as for the embodiment of FIG. 26.

Various embodiments of the invention described herein provide methods and apparatuses for sensing, calculating and comparing actual and ideal characteristics of a swing of an implement, such as club shaft plane characteristics, club face plane characteristics, rotational characteristics, hinging characteristics, and arc characteristics. It will be appreciated that the methods and apparatuses described herein have application to other swing-related characteristics, such as velocity and acceleration characteristics of a swing and coordination of foot, leg, and torso movements with the actual and ideal club positions during the swing.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention.

What is claimed is:

1. A muscle training apparatus for determining characteristics of a movement of a shaft of an implement by a person during performance of a useful or recreational function, the muscle training apparatus comprising:
- a support structure comprising a plurality of arms extending outwardly from a central portion of the support structure, each of the plurality of arms having a proximal end and a distal end, the plurality of arms including a first arm and a second arm disposed to an opposite side of the central portion from the first arm;
- an attachment mechanism for reversibly attaching the central portion of the support structure to the shaft of the implement such that the proximal ends of the arms are disposed adjacent the shaft;
- a first sensor disposed adjacent the distal end of the first arm, the first sensor for generating a first sensor signal indicative of a plurality of first positions and first directions of travel of the distal end of the first arm during the movement;
- a second sensor disposed adjacent the distal end of the second arm, the second sensor for generating a second sensor signal indicative of a plurality of second positions and second directions of travel of the distal end of the second arm during the movement,
- where the first and second positions and the first and second directions of travel of the first sensor and the second sensor at any particular point in the movement define an individual average shaft velocity vector substantially coinciding with the direction of travel of the shaft, and an individual shaft displacement vector aligned with the first position and the second position at the particular point; and
- a processor for calculating a plurality of individual average shaft velocity vectors, a plurality of individual shaft displacement vectors, a plurality of individual normal vectors, and a plurality of corresponding individual implement shaft planes based on the first and second sensor signals, wherein at any particular point in the movement an individual implement shaft plane substantially coincides with a corresponding individual average shaft velocity vector and an individual shaft displacement vector at the particular point and is perpendicular to an individual normal vector at the particular point.

2. The muscle training apparatus of claim 1 further comprising:
- the plurality of arms of the support structure including a third arm and a fourth arm disposed to an opposite side of the central portion from the third arm, wherein a line that is parallel to the third and fourth arms is perpendicular to a line that is parallel to the first and second arms;
- a third sensor disposed adjacent the distal end of the third arm, the third sensor for generating a third sensor signal indicative of a plurality of third positions and third directions of travel of the distal end of the third arm during the movement;
- a fourth sensor disposed adjacent the distal end of the fourth arm, the fourth sensor for generating a fourth sensor signal indicative of a plurality of fourth positions and fourth directions of travel of the distal end of the fourth arm during the movement,
- where the first position, second position, third position and fourth position at any particular point in the movement define an implement face plane at the particular point; and
- the processor for calculating the implement face plane based on the first, second, third, and fourth sensor signals.

3. The muscle training apparatus of claim 2 further comprising the processor for calculating a rotation angle between the implement face plane and the corresponding implement shaft plane at one or more positions during the movement.

4. The muscle training apparatus of claim 3 further comprising the processor for determining whether a difference between the rotation angle and an ideal rotation angle exceeds a rotation angle tolerance at one or more positions during the movement, and for generating an error signal when the difference exceeds the rotation angle tolerance.

5. The muscle training apparatus of claim 4 further comprising one or more force generators attached adjacent one or more of the distal ends of the arms for generating a training force based on the error signal to urge the shaft to rotate in a direction which would increase or decrease the difference if the training force is not opposed by muscle force exerted by the person.

6. The muscle training apparatus of claim 1 further comprising:
- a fifth sensor operable to be attached adjacent a wrist portion of a forearm of the person moving the implement, the fifth sensor for generating a fifth sensor signal indicative of a plurality of fifth positions and fifth directions of travel of the wrist portion of the forearm during the movement;
- a sixth sensor operable to be attached adjacent an elbow portion of the forearm of the person moving the implement, the sixth sensor for generating a sixth sensor signal indicative of a plurality of sixth positions and sixth directions of travel of the elbow portion of the forearm during the movement,
- where the fifth and sixth positions and the fifth and sixth directions of travel at any particular point in the movement define an individual average forearm velocity vector substantially coinciding with the direction of travel of the forearm of the person, and an individual forearm displacement vector substantially aligned with the fifth position and sixth position at the particular point; and
- the processor for calculating a plurality of individual average forearm velocity vectors, a plurality of individual forearm displacement vectors, a plurality of individual normal vectors, and a plurality of corresponding individual forearm planes based on the fifth and sixth sensor signals, wherein at any particular point in the movement an individual forearm plane substantially coincides with a corresponding individual average forearm velocity vector and an individual forearm displacement vector at the particular point and is perpendicular to an individual normal vector at the particular point.

7. The muscle training apparatus of claim 6 further comprising the processor for calculating a hinge angle between an individual forearm displacement vector and a corresponding individual shaft displacement vector at one or more positions during the movement.

8. The muscle training apparatus of claim 7 further comprising the processor for determining whether a difference between the hinge angle and an ideal hinge angle exceeds a hinge angle tolerance at one or more positions during the movement, and for generating an error signal when the difference exceeds the hinge angle tolerance.

9. The muscle training apparatus of claim 8 further comprising one or more force generators attached adjacent one or more of the distal ends of the arms for generating a training force based on the error signal to urge the shaft in a hinge direction which would increase or decrease the difference if the training force is not opposed by muscle force exerted by the person.

10. The muscle training apparatus of claim 1 further comprising:
a seventh sensor operable to be attached adjacent a xiphoid process at a lower portion of a sternum of the person moving the implement, the seventh sensor for generating a seventh sensor signal indicative of a plurality of seventh positions and seventh directions of travel of the xiphoid process during the movement,
where the seventh positions and seventh directions of travel at any particular point in the movement define an individual average xiphoid process velocity vector substantially coinciding with the direction of travel of the xiphoid process of the person, and an individual arc displacement vector aligned between the second position and seventh position at the particular point; and
the processor for calculating a plurality of individual average arc velocity vectors, a plurality of individual arc displacement vectors, a plurality of individual normal vectors, and a plurality of corresponding individual arc planes based on the second and seventh sensor signals, wherein at any particular point in the movement an individual arc plane substantially coincides with a corresponding individual average arc velocity vector and an individual arc displacement vector at the particular point and is perpendicular to an individual normal vector at the particular point.

11. The muscle training apparatus of claim 10 further comprising the processor for calculating an arc distance between the seventh position and the second position during the movement.

12. The muscle training apparatus of claim 11 further comprising the processor for determining whether a difference between the arc distance and an ideal arc distance exceeds an arc distance tolerance at one or more positions during the movement, and for generating an error signal when the difference exceeds the arc distance tolerance.

13. The muscle training apparatus of claim 12 further comprising one or more force generators attached adjacent one or more of the distal ends of the arms for generating a training force based on the error signal to urge the shaft in a direction which would increase or decrease the difference if the training force is not opposed by muscle force exerted by the person.

14. The muscle training apparatus of claim 1 wherein the processor is further for calculating a composite implement shaft plane based on the plurality of individual implement shaft planes.

15. The muscle training apparatus of claim 1 further comprising the processor for determining whether a difference between one or more of the individual shaft planes and an ideal individual shaft plane exceeds a shaft plane tolerance at one or more positions during the movement, and for generating an error signal when the difference exceeds the shaft plane tolerance.

16. The muscle training apparatus of claim 15 further comprising one or more force generators attached adjacent one or more of the distal ends of the arms for generating a training force based on the error signal to urge the shaft in a direction which would increase or decrease the difference if the training force is not opposed by muscle force exerted by the person.

17. The muscle training apparatus of claim 1 further comprising one or more force generators attached adjacent one or more of the distal ends of the arms for generating random training forces.

\* \* \* \* \*